(12) United States Patent
Oowada

(10) Patent No.: US 8,010,256 B2
(45) Date of Patent: Aug. 30, 2011

(54) COLLISION DETECTOR

(75) Inventor: Tohru Oowada, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 415 days.

(21) Appl. No.: 12/379,302

(22) Filed: Feb. 18, 2009

(65) Prior Publication Data

US 2009/0210117 A1 Aug. 20, 2009

(30) Foreign Application Priority Data

Feb. 20, 2008 (JP) ................................ 2008-039277
Jan. 21, 2009 (JP) ................................ 2009-010722

(51) Int. Cl.
*B60R 21/013* (2006.01)
(52) U.S. Cl. ....................... 701/46; 280/735; 180/282
(58) Field of Classification Search .................. 701/45, 701/46, 47; 340/436; 180/282; 280/735
See application file for complete search history.

(56) References Cited

U.S. PATENT DOCUMENTS

| | | | | |
|---|---|---|---|---|
| 5,338,062 A | * | 8/1994 | Kiuchi et al. ................. | 280/735 |
| 5,363,303 A | * | 11/1994 | Kaneko et al. ................. | 701/45 |
| 6,330,500 B1 | * | 12/2001 | Moriyama et al. .............. | 701/45 |
| 6,353,784 B1 | * | 3/2002 | Miyaguchi et al. ............. | 701/45 |
| 7,541,917 B2 | * | 6/2009 | Hosokawa ..................... | 340/436 |
| 2006/0224289 A1 | * | 10/2006 | Kiribayashi et al. ............ | 701/45 |
| 2008/0109136 A1 | * | 5/2008 | Liao et al. ...................... | 701/45 |

FOREIGN PATENT DOCUMENTS

| | | |
|---|---|---|
| JP | 03-020674 | 1/1991 |
| JP | 05-139226 | 6/1993 |
| JP | 10-194075 | 7/1998 |
| JP | 11-091496 | 4/1999 |
| JP | 2001-239916 | 9/2001 |
| JP | 2002-513346 | 5/2002 |
| JP | 2006-056441 | 3/2006 |

* cited by examiner

*Primary Examiner* — Paul N Dickson
*Assistant Examiner* — Timothy D Wilhelm
(74) *Attorney, Agent, or Firm* — Wenderoth, Lind & Ponack, L.L.P.

(57) ABSTRACT

A vehicle collision detector is configured to reliably activate an airbag system at a collision and prevent the airbag system from erroneously operating. The collision detector includes two acceleration sensors disposed at different positions in a vehicle to detect acceleration for collision determination, first and second collision routines in which a determination is made on whether or not a variation in the detected acceleration is caused by a collision, and a final collision routine in which an airbag module is activated when all of results of the first and second collision routines indicate a collision.

4 Claims, 17 Drawing Sheets

FIRST COLLISION DETERMINATION

SECOND COLLISION DETERMINATION

MAIN PROCESSING OF CONTROL PROGRAM P

MAIN PROCESSING OF CONTROL PROGRAM P

COLLISION DETECTOR

CROSS REFERENCE TO RELATED APPLICATION

The present application is based on and claims priority from Japanese Patent Application No. 2008-39277, filed on Feb. 20, 2008 and No. 2009-10722, filed on Jan. 21, 2009, the disclosure of which is hereby incorporated by reference in its entirety.

BACKGROUND OF THE INVENTION

1. Field of the Invention

The present invention relates to a collision detector which detects a collision of an automobile.

2. Description of the Related Art

In the prior art, a collision detector to detect a collision of an automobile is known (disclosed in Japanese Unexamined Patent Application Publication No. Hei 3-20674, for example).

Recently, an automobile is equipped with an occupant protector unit such as an airbag system in order to secure safety of occupants at a collision.

The airbag system is configured to explode an airbag in receiving a high impact over a predetermined amount of force and use it for a cushion for the head of an occupant so as to protect the occupant from the impact.

FIG. 1 shows a prior art collision detector 1 which is placed in an airbag sensor unit below a vehicle dashboard and comprises sensor units SU1, SU2, a comparator 2, a determiner circuit 3, and an activator circuit 4.

Also, an airbag module 5 is provided in the center of a steering wheel, for example, and mainly comprised of an airbag and an inflator to explode the airbag.

The sensor unit SU1 is comprised of an acceleration sensor S1 and an amplifier A1 while the sensor unit SU2 is comprised of an acceleration sensor S2 and an amplifier A2. The acceleration sensors S1, S2 detect acceleration of the vehicle at their respective positions to output a signal with a voltage which is in proportion to a detected acceleration.

The acceleration sensor S1 is placed over a front side member to detect a front collision of the vehicle while the acceleration sensor S2 is placed in the airbag sensor unit for the purpose of improving reliability of collision detection.

The acceleration sensors S1, S2 are disposed to detect the acceleration in the same direction relative to a front-back direction of the vehicle. Output terminals of the acceleration sensors S1, S2 are connected with input terminals of the amplifiers A1, A2 to have inverse polarities so that in receiving acceleration in the front-back direction of the vehicle, the sensor units SU1, SU2 generate inverse output potentials relative to GND.

The comparator 2 includes an input terminal 2a for positive feedback, an input terminal 2b for negative feedback and an output terminal 2c. The input terminals 2a, 2b are connected with the output terminals of the amplifiers A1, A2 respectively, and the output terminal 2c is connected with the determiner circuit 3.

The comparator 2 amplifies a signal with a potential difference $V_{+-}$ between a potential of $V_+$ of the input terminal 2a and that $V_-$ of the input terminal 2b and output it to the output terminal 2c.

The determiner circuit 3 determines whether or not the vehicle is colliding according to a predetermined potential difference $V_{+-}$ between a potential of $V_+$ of the input terminal 2a and that $V_-$ of the input terminal 2b, that is, between the output potential $V_+$ of the sensor unit SU1 and that $V_-$ of the sensor unit SU2.

Upon determining that a signal from the output terminal 2c of the comparator 2 is due to a collision, the determiner circuit 3 outputs a signal to the activator circuit 4. The activator circuit 4 activates the airbag module 5 to instantaneously explode the airbag, receiving the signal.

Meanwhile, various electric noises constantly occur in the automobile from wiring of an ignition system or the like, for example.

The prior art collision detector 1 has a problem that these electric noises may enter signal paths between the acceleration sensors S1, S2 and the comparator 2, and cause erroneous activation of the airbag module 5.

The airbag system originally aims to protect occupants from a vehicle collision, however, the airbag system may be erroneously activated during vehicle running.

In the prior art collision detector 1, when the acceleration sensors S1, S2 receive the same acceleration, the output potentials $V_+$ (FIG. 2A), $V_-$ (FIG. 2B) of the sensor units SU1, SU2 become inverse to each other relative to GND, for example.

The potential difference $V_{+-}$ between the potentials $V_+$, $V_-$ is a value obtained by adding absolute values $|V_+|$, $|V_-|$ of the potentials $V_+$, $V_-$ (FIG. 2C). The collision detector 1 determines that the vehicle is colliding when the potential difference $V_{+-}$ is a predetermined voltage threshold $V_{th}$ or more.

Electric noises in the vehicle are mostly electromagnetic noises, and noise signals entering the signal paths between the acceleration sensors S1, S2 and the comparator 2 often have a similar signal pattern.

When the signal paths receive the electric noises, the output potential $V_+$ of the sensor unit SU1 (FIG. 3A) and the output potential $V_-$ of the sensor unit SU2 (FIG. 3B) vary in a similar pattern relative to GND over time.

In this case, a difference between the potentials $V_+$, $V_-$ will be a difference between their respective absolute values $|V_-|$, $|V_+|$, which is a very small value (FIG. 3C). These electric signals due to noises are generally negated with each other so that the collision detector 1 is prevented from activating the airbag module 5 in response to the electric signals.

However, as shown in FIGS. 4A, 4B, in a case where noise signals entering the signal path between the acceleration sensor S1 and the comparator 2 and those entering the signal path between the acceleration sensor S2 and the comparator 2 have different signal patterns, these noise signals cannot be negated with each other. This may cause a problem of erroneously activating the airbag module 5 since the potential difference $V_{+-}$ is a large value as shown in FIG. 4C.

SUMMARY OF THE INVENTION

In view of solving the above problems, an object of the present invention is to provide a collision detector which can reliably activate an occupant protector unit such as an airbag at a vehicle collision, and prevent erroneous operation of the occupant protector unit due to electric noises.

According to one aspect of the present invention, a collision detector which detects a collision of a vehicle to activate an occupant protector unit is provided. The collision detector comprises a plurality of acceleration sensors provided at different positions in the vehicle to detect acceleration of the vehicle, a collision determiner unit which determines whether or not a variation in the acceleration detected by each of the acceleration sensors is caused by a collision of the vehicle, a final determiner unit which activates the occupant protector unit when the collision determiner unit determines that all of variations in the acceleration detected by each acceleration sensor are caused by a collision of the vehicle, an acceleration determiner unit which determines whether or not the acceleration detected by each acceleration sensor is equal to or over a predetermined threshold, and a speed variation determiner unit which determines whether or not a speed variation of the vehicle coincides with a pre-stored speed variation which occurs at a collision when the acceleration determiner unit determines that the acceleration is equal to or over the predetermined threshold, wherein when receiving a same acceleration, at least one of the acceleration sensors is set to be higher in output level than the other acceleration sensor(s).

In one features of this aspect, the collision detector further comprises an overflow unit which determines whether or not a collision of the vehicle occurs according to an output level of the other acceleration sensor(s) when an output level of the at least one acceleration sensor reaches an upper limit or a lower limit.

In the other features of this aspect, the collision detector further comprises a rear collision determiner unit which determines which of a front collision and a rear collision causes a variation in the detected acceleration of each of the acceleration sensors, and an activation delaying unit which delays an activation timing for the occupant protection unit from an activation timing for the occupant protection unit at a front collision when the rear collision determiner unit determines that a rear collision causes the variation in the detected acceleration of each of the acceleration sensors, wherein the activation delaying unit delays the activation timing for the occupant protection unit from the activation timing for the occupant protection unit at a front collision when the rear collision determiner unit determines that a rear collision causes the variation in the detected acceleration of each of the acceleration sensors, and when the final determiner unit activates the occupant protector unit.

DESCRIPTION OF THE PREFERRED EMBODIMENTS

Hereinafter, embodiments of the present invention will be described in detail with reference to the accompanying drawings.

First Embodiment

Figure 1:
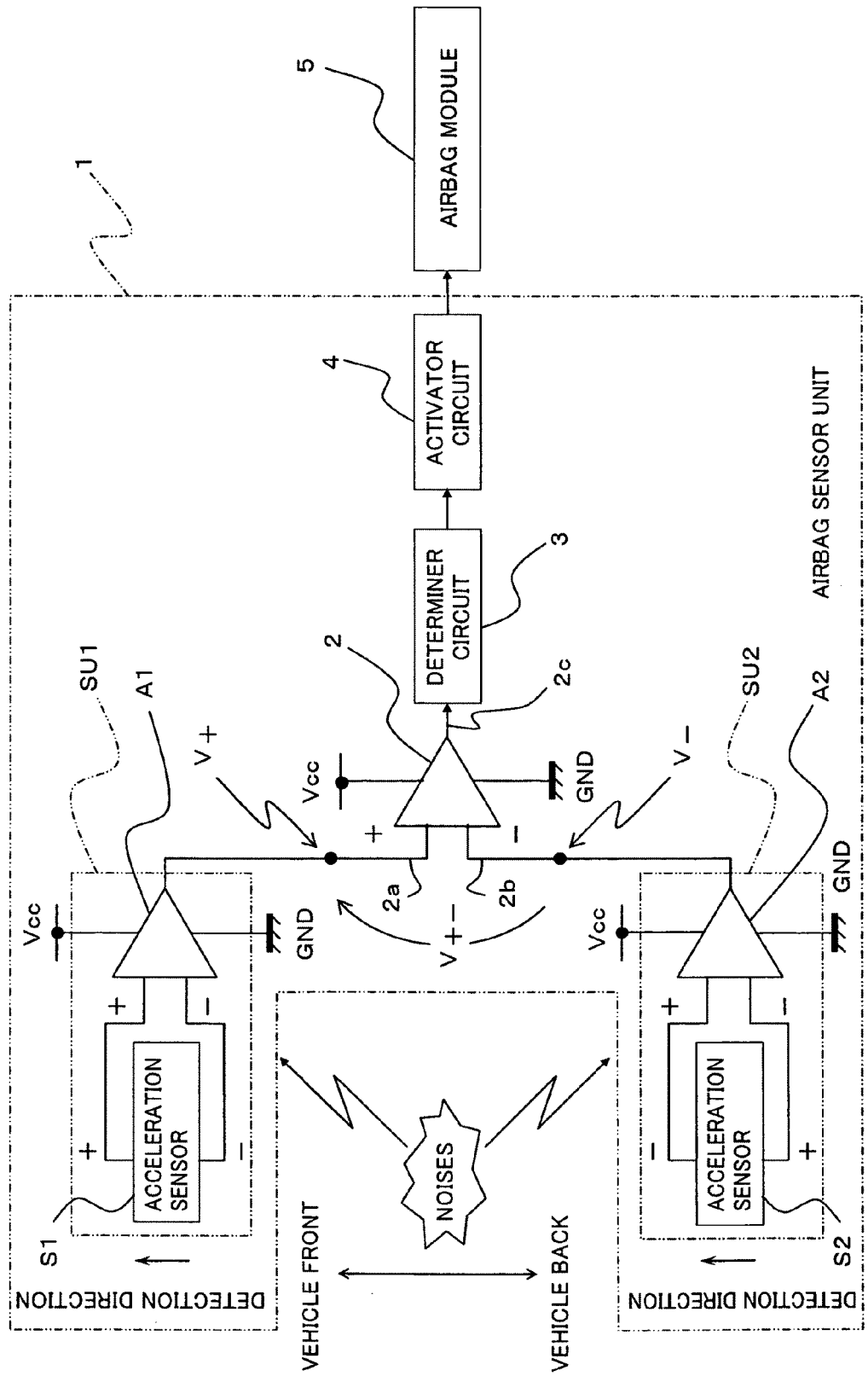
FIG. 1 schematically shows a structure of a prior art collision detector.
Figure 2A:
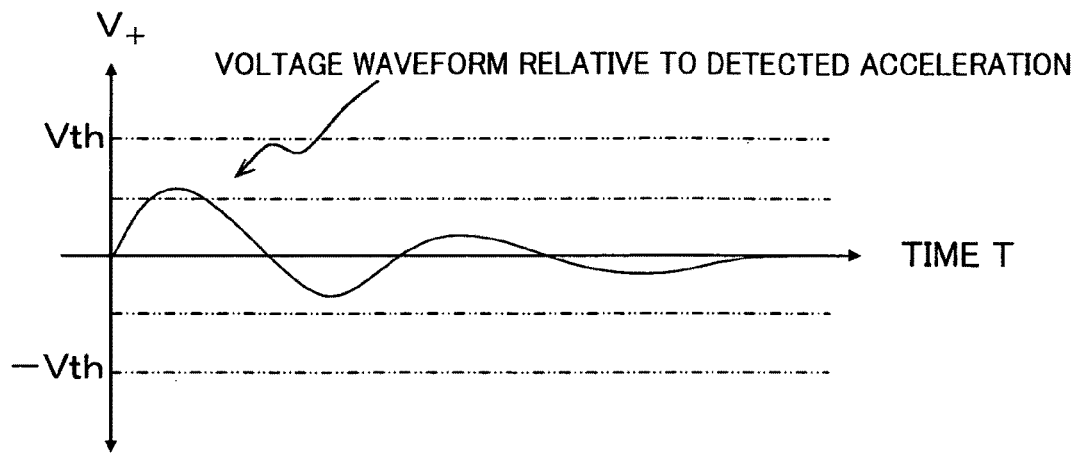
FIGS. 2A, 2B show one example of variation in output potential of each sensor unit when two acceleration sensors detect acceleration due to a collision in the prior art collision detector.
Figure 2B:
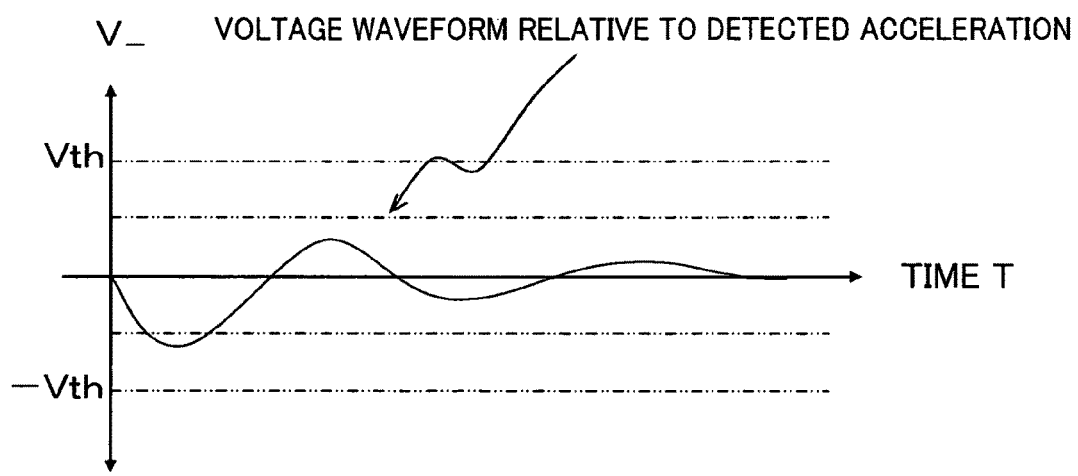
Figure 2C:
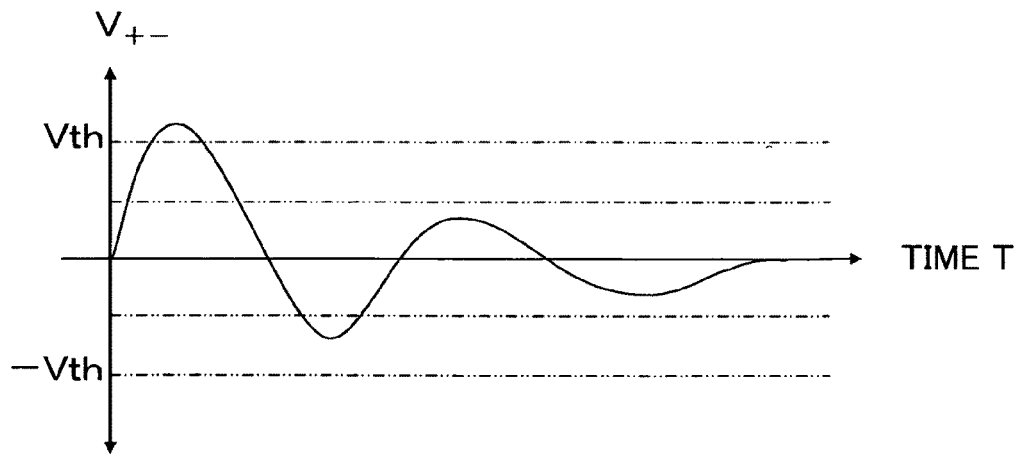
FIG. 2C shows a variation over time in difference in the output potentials of the two acceleration sensor units.
Figure 3A:
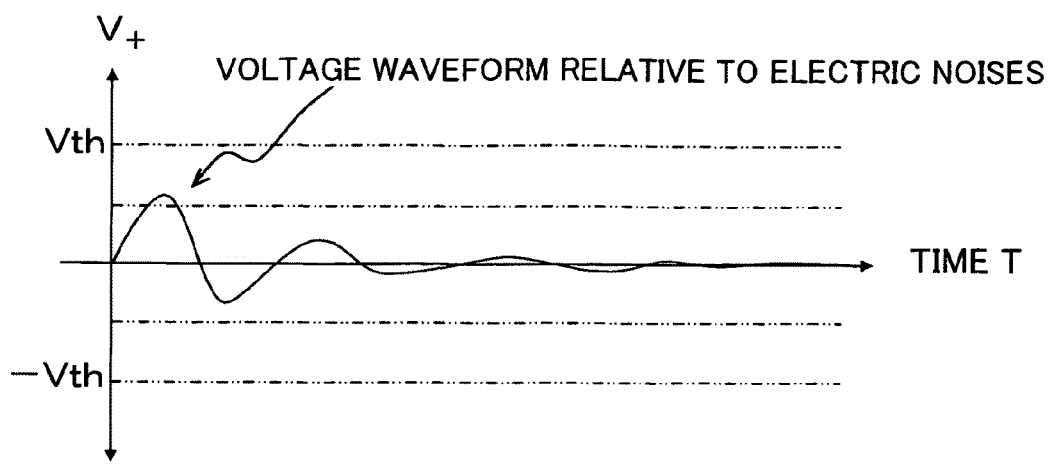
FIGS. 3A, 3B show one example of variation in output potential of each sensor unit when electric noises with a similar signal pattern enter a signal path between one sensor unit and a comparator and a signal path between the other sensor unit and the comparator in the prior art collision detector.
Figure 3B:
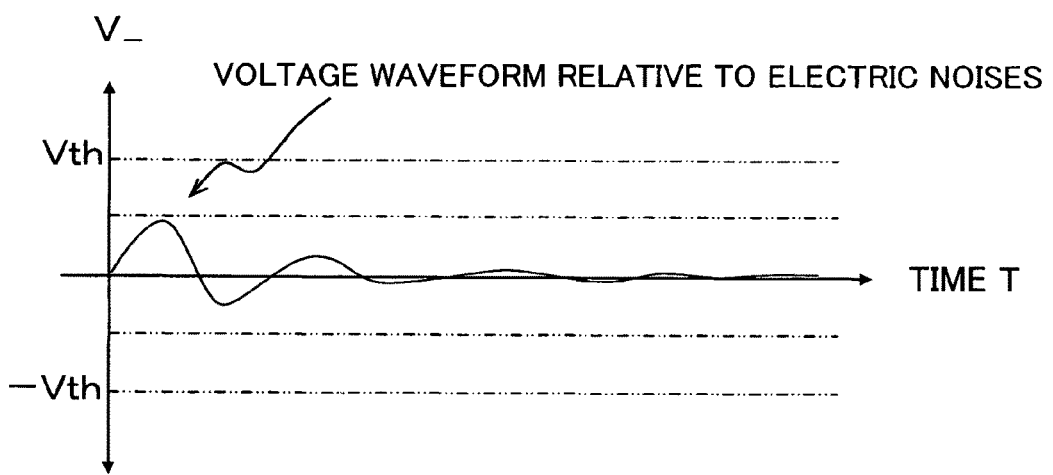
Figure 3C:
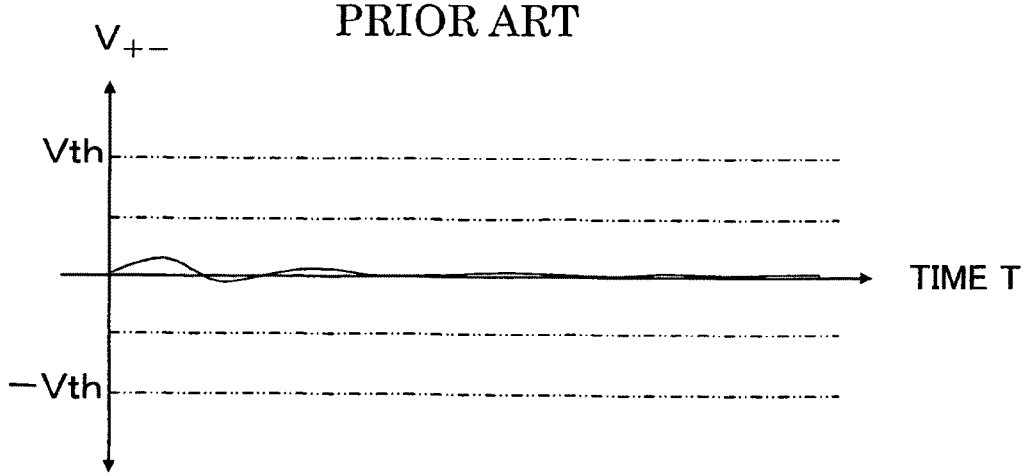
FIG. 3C shows a variation over time in difference in the output potentials of the two acceleration sensor units.
Figure 4A:
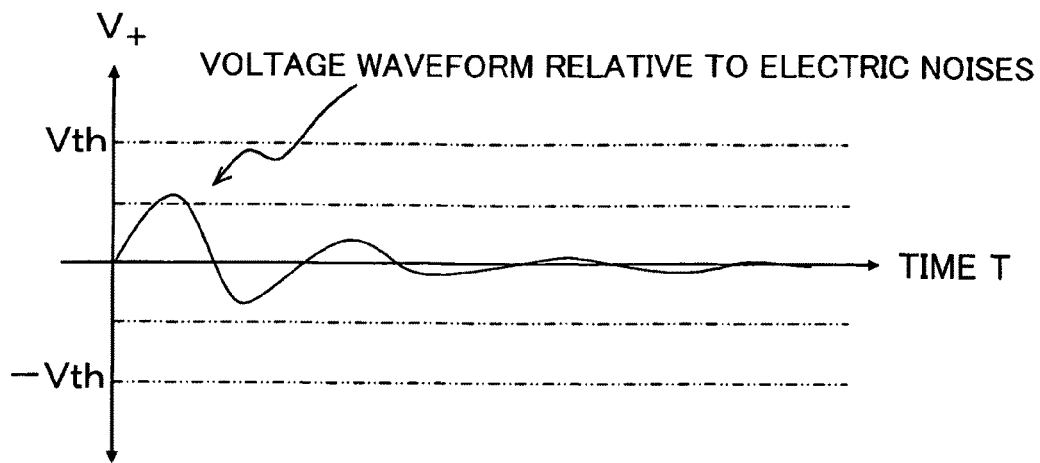
FIGS. 4A, 4B show one example of variation in output potential of each sensor unit when electric noises with different signal patterns enter a signal path between one sensor unit and a comparator and a signal path between the other sensor unit and the comparator in the prior art collision detector.
Figure 4B:
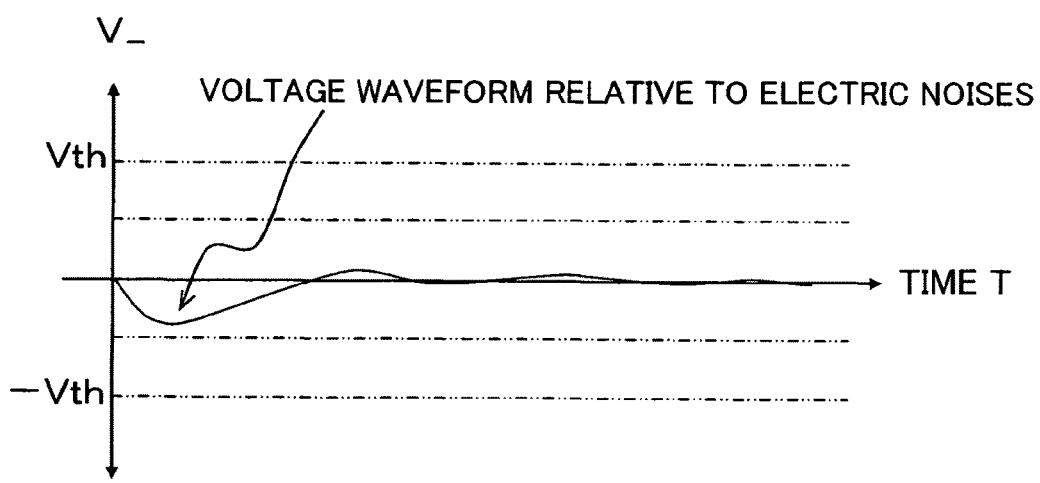
Figure 4C:
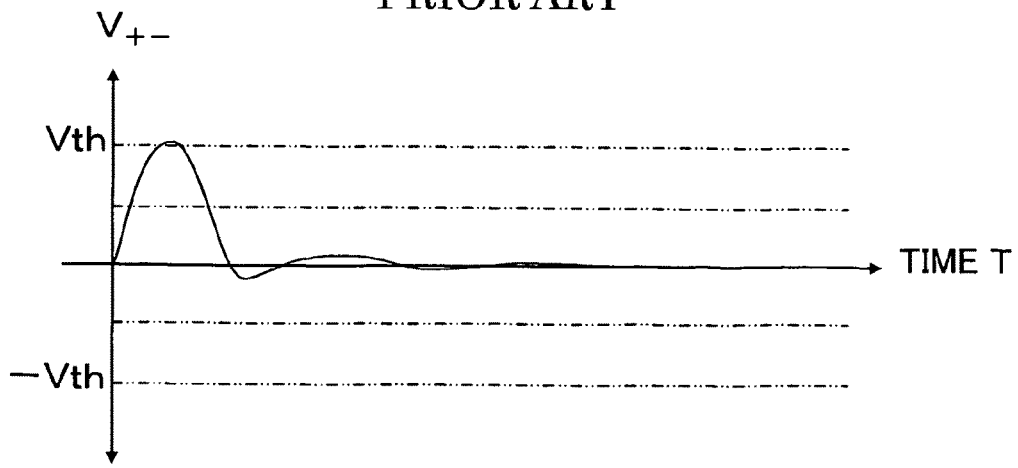
FIG. 4C shows a variation over time in difference in the output potentials of the two acceleration sensor units.
Figure 5A:
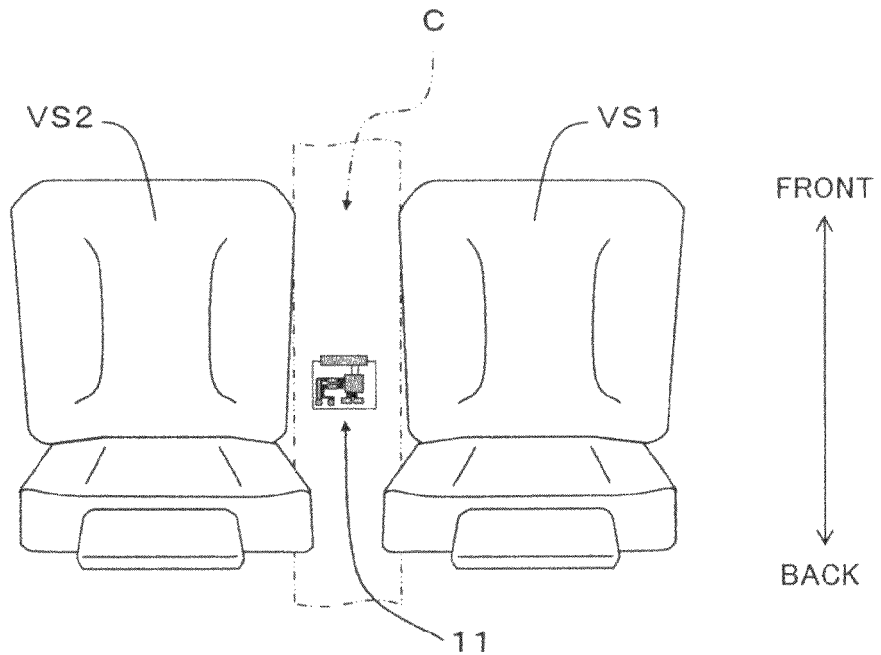
FIGS. 5A is a top view of front seats in a vehicle showing a position of a collision detector according to first and second embodiments.

FIG. 5A shows a collision detector 11 according to a first embodiment of the present invention which is placed in a center console C between a driver's seat VS1 and a passenger's seat VS2.

Figure 6:
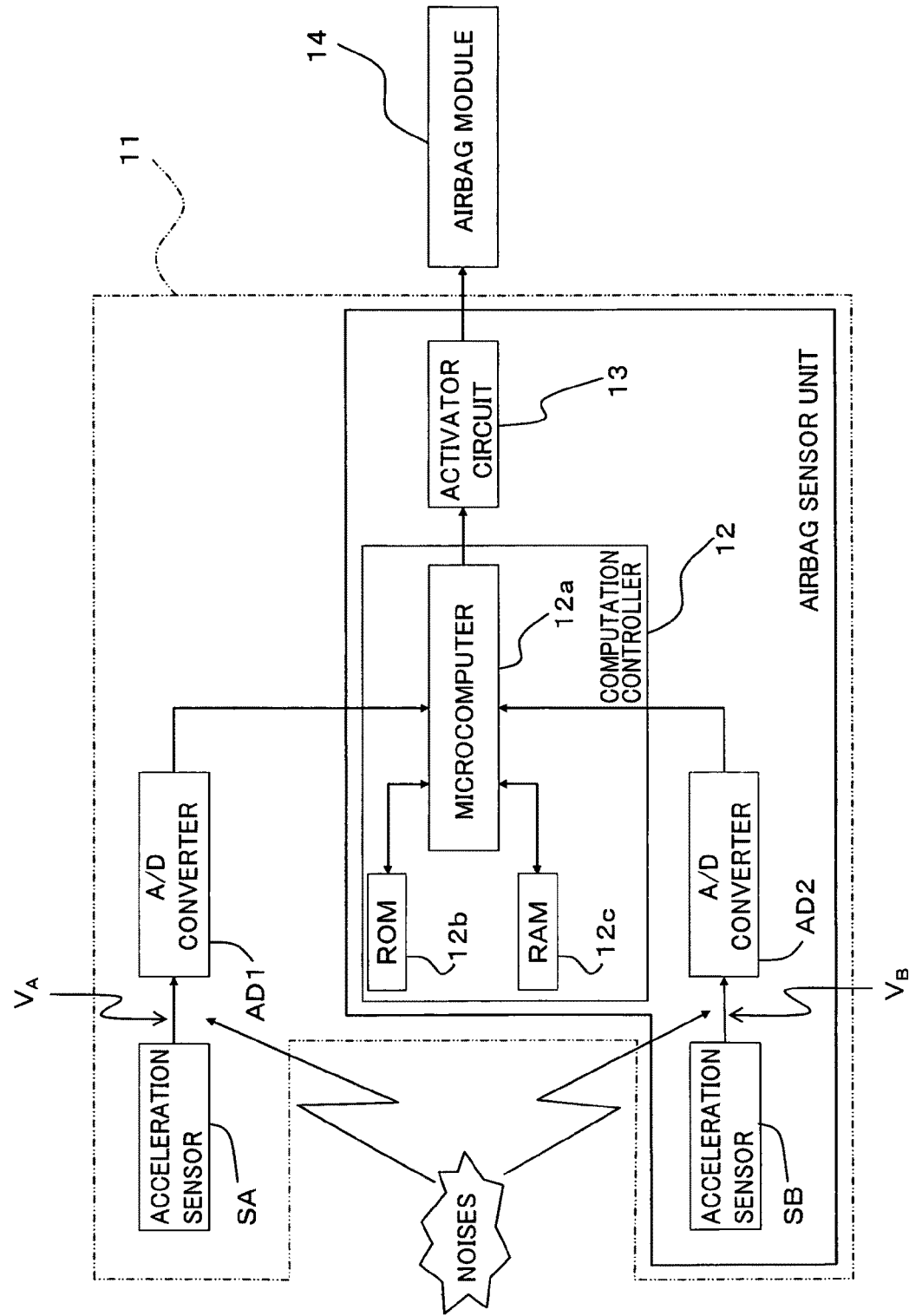
FIG. 6 schematically shows a structure of a collision detector according to the first and second embodiments.

In FIG. 6, the collision detector 11 comprises acceleration sensors SA, SB, A/D converters AD1, AD2, a computation controller 12, and an activator circuit 13.

An airbag module 14 (occupant protector unit) is provided in the center of a steering wheel, for example and mainly comprised of an airbag and an inflator which expands the airbag.

Figure 5B:
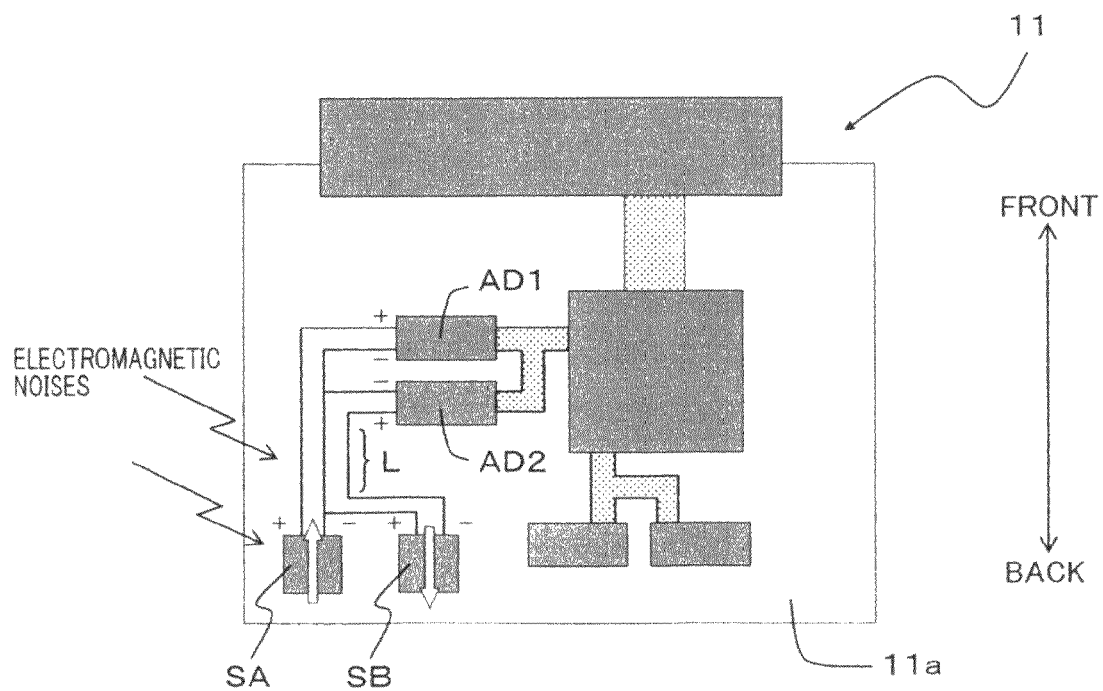
FIG. 5B is a top view of the collision detector.

As shown in FIG. 5B, the collision detector 11 according to the present embodiment is configured to detect a vehicle collision based on acceleration data detected by the acceleration sensors SA, SB mounted on a circuit board 11a of the collision detector 11, in order to activate the airbag module 14.

In the present embodiment, the acceleration sensors SA, SB each incorporate an amplifier to detect acceleration of the vehicle at their respective positions and output signals with a voltage which is in proportion to acceleration values.

In the collision detector 11 of the present embodiment, the acceleration sensors SA, SB are disposed close to each other on the circuit board 11a so that detection directions thereof coincide with a vehicle front-back direction. The positive detection direction of the acceleration sensors SA is towards a vehicle front side while that of the acceleration sensor SB is towards a vehicle rear side. Outline arrows in FIG. 5B indicate the detection directions of the acceleration sensors SA, SB.

Signal paths L connecting the acceleration sensors SA, SB and the A/D converters AD1, AD2 are respectively adjacent to each other on the circuit board 11a. Because of this, when electromagnetic noises enter the signal paths L from outside of the collision detector 11, noise signals with a similar signal pattern enter both of the A/D converters AD1, AD2.

In order to prevent erroneous operation due to the noise signals entering the signal paths L, the collision detector 11 according to the present embodiment is configured that noise signals entering the A/D converter AD1 is negated with those entering the A/D converter AD2 by setting polarity of a connection between the A/D converter AD1 and the acceleration sensors SA and that of a connection between the A/D converter AD2 and the acceleration sensors SB to be inverse to each other.

As shown in FIG. 6, the present embodiment uses an acceleration sensor with the detection range of −50 G to +50 G for the acceleration sensor SA. It is configured to output signals with a voltage $V_A[V]$ of 0V to 5V in proportion to detected acceleration $a_A[G]$ in a range of −50 G to +50 G.

An acceleration sensor with the detection range of −30 G to +30 G is used for the acceleration sensor SB. It is configured to output signals with a voltage $V_B[V]$ of 0V to 5V in proportion to detected acceleration $a_B[G]$ in a range of −30 G to +30 G. Thus, the acceleration sensors SA, SB output a voltage of 2.5V at acceleration being 0 G.

In the following, the upper limit (50 G) of the acceleration sensor SA is referred to as $a_{Ar}$, the upper limit (30 G) of the acceleration sensor SB is referred to as $a_{Br}$, and the center value (2.5V) of the output voltage 0 to 5V is referred to as $V_C$.

The acceleration sensor SA is provided over a front side member of a vehicle for detection of a front collision while the acceleration sensor SB is provided inside the airbag sensor unit for the purpose of improving reliability of collision detection.

The acceleration sensors SA, SB are disposed so that their detection directions are opposite to each other relative to the front-back direction of the vehicle.

Output terminals of the acceleration sensors SA, SB are connected with the A/D converters AD1, AD2 which convert analog voltage signals output from the acceleration sensors SA, SB into digital signals relative to voltage values.

A computation controller 12 comprises a microcomputer 12a, ROM 12b, and RAM 12c and the microcomputer 12a is connected with outputs of the ROM 12b, and RAM 12c and the A/D converters AD1, AD2.

The ROM 12b stores a later-described control program P for the collision detector 11 according to the present embodiment. The control program P is executed by the computation controller 12. The ROM 12b also stores information such as driving speed profile at a collision.

The memory area of the RAM 12c is used for a work area of the microcomputer 12a for execution of the control program P.

The computation controller 12 determines whether or not the vehicle is colliding based on acceleration data on each digital signal from the A/D converter AD1, AD2, and outputs a control signal to the activator circuit 13 upon determining that the vehicle is colliding.

The activator circuit 13 activates the airbag module 14 in response to the control signal to instantaneously explode the airbag.

Next, the flow of the control program P for the collision detector 11 of the present embodiment will be described. The control program P includes processes shown in FIGS. 7 to 9 executed by the computation controller 12.

Figure 7:
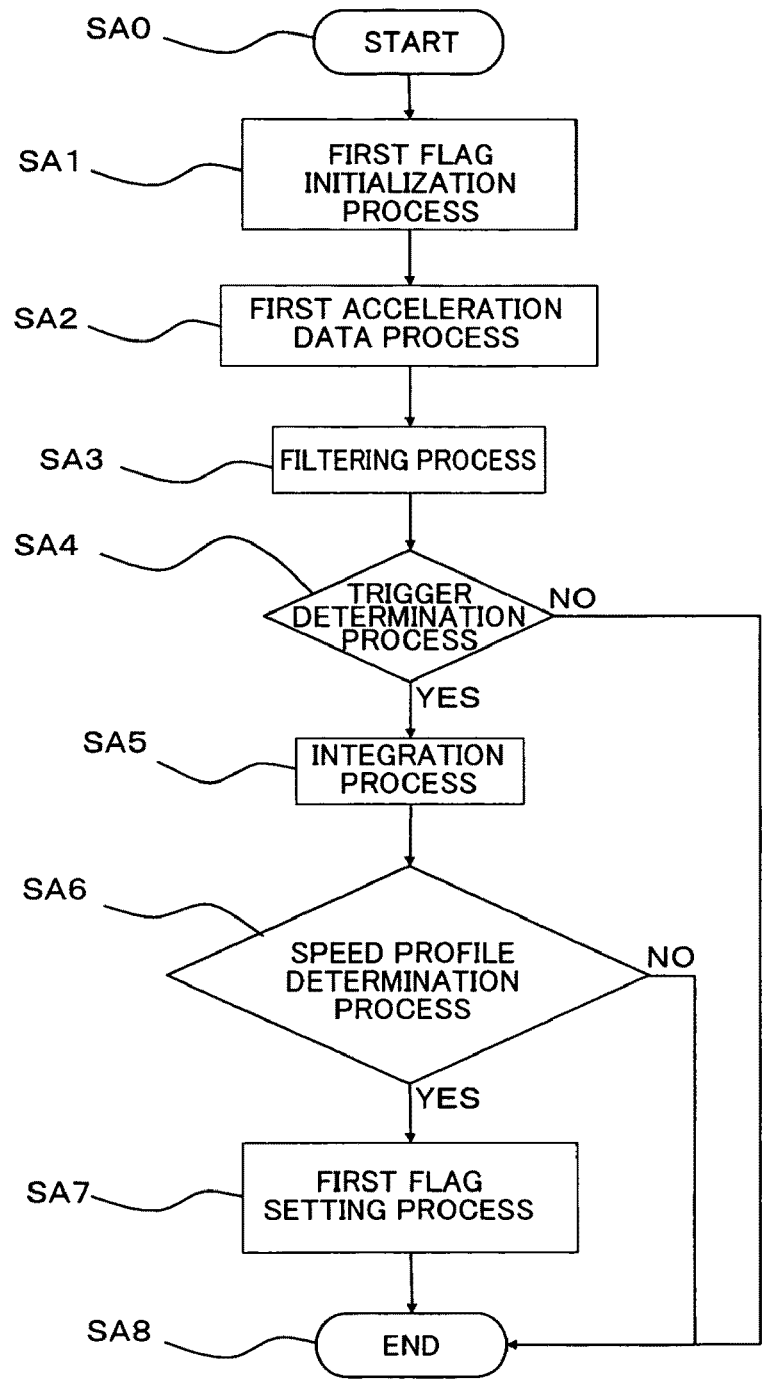
FIG. 7 is a flowchart describing a first collision determination process for one of two acceleration sensors according to the first and second embodiments.

First, a first collision determination process in FIG. 7 will be described.

At step SA0, the first collision determination process starts.

The control program P comprises a first flag in which a result of the collision determination for the acceleration sensor SA is stored as a logic value.

At step SA1, the logic value of the first flag is initialized to zero (false) (first flag initialization process). At step SA2, the microcomputer 12a acquires a voltage value relative to a detected acceleration of the acceleration sensor SA with a constant interval (first acceleration data process). At step SA3, voltage data corresponding to a detected acceleration of the acceleration sensor SA is subjected to a low-pass filter and a high-pass filter by software to eliminate unnecessary signal components (noise) (filtering process). Then, at step SA4, a voltage value $V_A$ corresponding to a detected acceleration of the acceleration sensor SA is determined to be equal to or over a voltage threshold $V_{Ath}$. With the voltage $V_A$ being equal to or over $V_{Ath}$, the flow proceeds to step SA5 while with the voltage $V_A$ being less than $V_{Ath}$, the flow proceeds to step SA8 (trigger determination process). The voltage V is an output voltage of the acceleration sensor SA when the detected acceleration $a_A$ matches the threshold $a_{th}$.

AT step SA5, voltage data relative to a detected acceleration of the acceleration sensor SA is integrated with respect to the time to obtain data on speed variation of the vehicle (integration process). At step SA6, a determination is made based on the integrated speed variation data on whether or not a speed variation profile coincides with that at a vehicle collision stored in the ROM. With the two profiles' coinciding, the flow proceeds to step SA7 and with the two profiles' not coinciding, the flow proceeds to step SA8 (speed profile determination process). At step SA7, a logic value of the first flag is set to 1 (true) (first flag setting process), and the first collision determination process is completed at step SA8.

Note that magnitude of acceleration detected due to a vehicle collision is assumed not to be 50 G or more.

Figure 8:
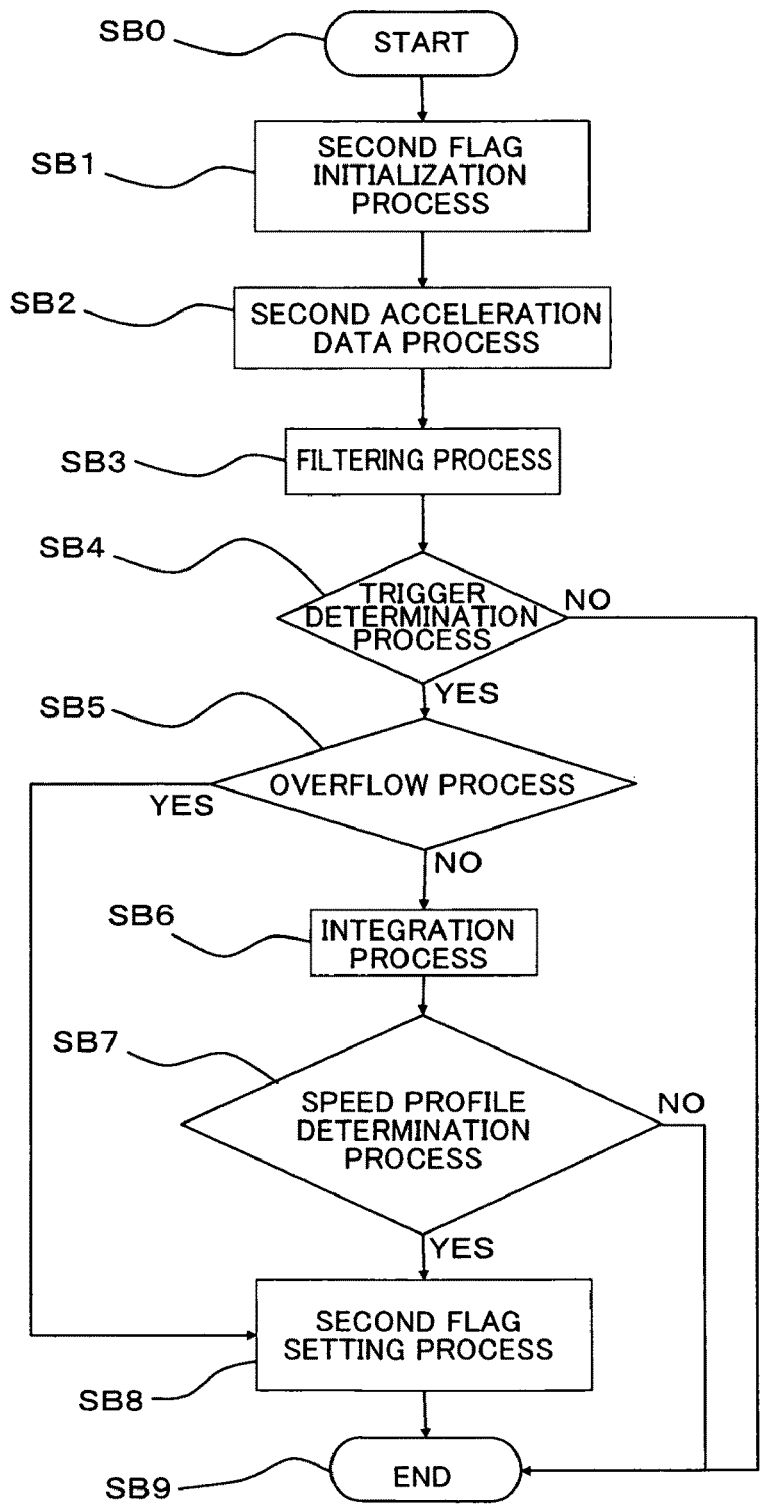
FIG. 8 is a flowchart describing a second collision determination process for the other of the two acceleration sensors according to the first and second embodiments.

Next, a second collision determination process will be described with reference to FIG. 8.

At step SB0 the second collision determination process starts.

The control program P comprises a second flag in which a result of collision determination for the acceleration sensor SB is stored as a logic value.

At step SB1, the logic value of the second flag is initialized to zero (false) (second flag initialization process). At step SB2, the microcomputer 12a acquires a voltage value relative to a detected acceleration of the acceleration sensor SB with a constant interval (second acceleration data process). At step SB3, voltage data corresponding to a detected acceleration of the acceleration sensor SB is subjected to a low-pass filter and a high-pass filter by software to eliminate unnecessary signal components (noise) (filtering process). Then, at step SB4, a determination is made on whether or not a voltage value $V_B$ corresponding to a detected acceleration of the acceleration sensor SB is equal to or over a predetermined voltage threshold $V_{Bth}$. With the voltage $V_B$ being equal to or over $V_{Bth}$, the flow proceeds to step SB5 while with the voltage $V_B$ being less than $V_{Bth}$, the flow proceeds to step SB9 (trigger determination process). The voltage threshold $V_{Bth}$ is an output voltage of the acceleration sensor SB when the detected acceleration $a_B$ matches the threshold $a_{th}$.

At step SB5, when a voltage value $V_B$ corresponding to a detected acceleration $a_B$ of the acceleration sensor SB is the upper limit (5V) or lower limit (0V) over a predetermined speed profile time $t_p$, the flow proceeds to step SB8. With the voltage value different from the upper or lower limit, the flow proceeds to step SB6 (overflow process). The detected acceleration $a_B$ of the acceleration sensor SB being not an absolute value $a_{Br}$ ($a_{Br}$=30 G) of the upper and lower limits of the detectable range thereof signifies that the acceleration sensor SB is in overflow state so that a collision determination is performed only from data of the acceleration sensor SA.

At step SB6, the voltage value data relative to the detected acceleration of the acceleration sensor SB is integrated with regard to the time to obtain data on speed variation of the vehicle (integration process). At step SB7, a determination is made based on the speed variation data on whether or not speed variation profile coincides with that at a vehicle collision stored in the ROM. With the two profiles' coinciding, the flow proceeds to step SB8 while with the two profiles' not coinciding, the flow proceeds to step SB9 (speed profile determination process). At step SB8, a logic value of the second flag is set to 1 (true) (second flag setting process), and the second collision determination process is completed at step SB9.

Note that the voltage thresholds $V_{Ath}$, $V_{Bth}$ correspond to the accelerations $a_A$, $a_B$ detected by the acceleration sensors SA, SB in the trigger determination process SA4, SB4, respectively.

Figure 9:
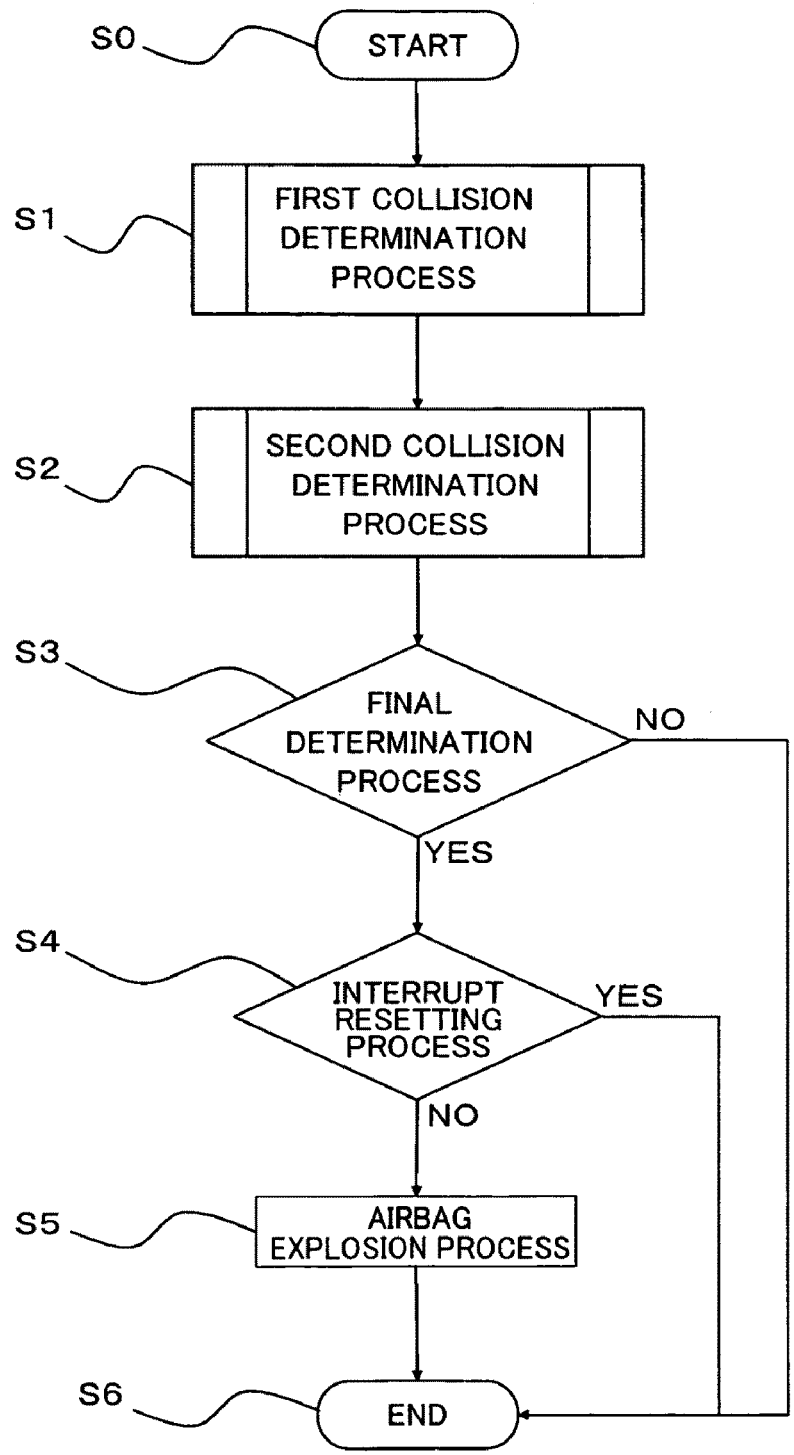
FIG. 9 is a flowchart describing the main processing of a control program according to the first embodiment.

Next, the main processing of the control program P will be described with reference to FIG. 9.

At step S0 the main processing starts.

At step S1 the above-described first collision determination process (FIG. 7) is executed.

At step S2 the above-described second collision determination process (FIG. 8) is executed.

At step S3 a determination is made on whether or not a logical product (AND) of logic values of the first and second flags is 1 (true) or not. With the logic value being 1 (true), the flow proceeds to step S4 while with the logic value being zero (false), the flow proceeds to step S6 (final determination process). At step S4 a determination is made on whether an order for cancellation of airbag explosion is issued or not. Without the cancellation order, the flow proceeds to step S5, and with the cancellation order, the flow proceeds to step S6 (interrupt resetting process). At step S5 a control signal is output to the activator circuit 13 to activate the airbag module 14 (airbag explosion process).

At step S6, the main processing of the control program P is completed.

Figure 10:
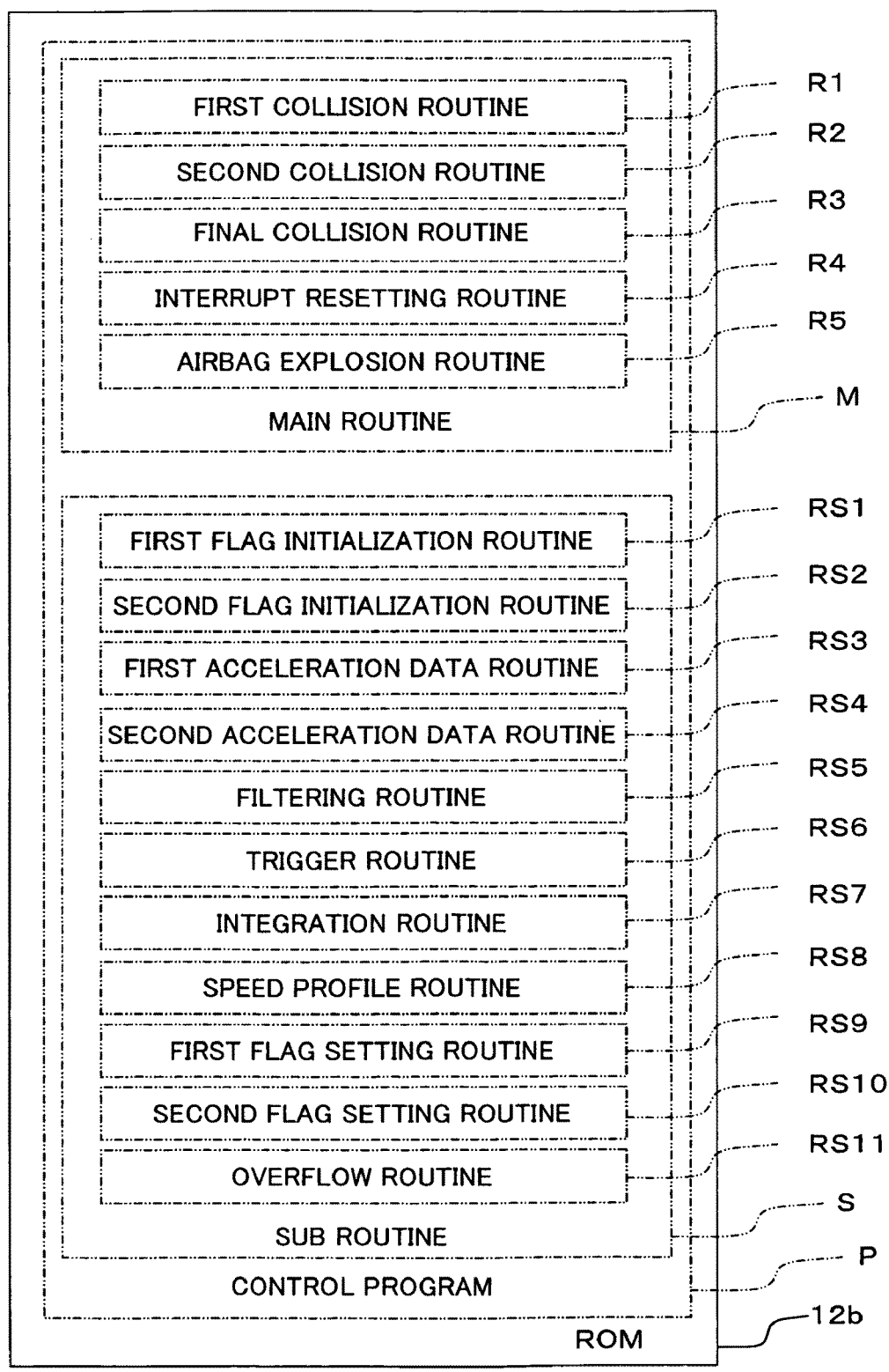
FIG. 10 shows a structure of the control program according to the first embodiment.

Next, the configuration of the control program will be described. As shown in FIG. 10, the control program P in the ROM 12b is constituted of a main routine M and a sub routine S.

The main routine M includes a first collision routine (collision determiner unit) R1 executing the first collision determination process, a second collision routine (collision determiner unit) R2 executing the second collision determination process, a final collision routine (final determiner unit) R3 executing the final determination process, an interrupt resetting routine R4 executing the interrupt resetting process, and an airbag explosion routine R5 executing the airbag explosion process.

The sub routine S includes a first flag initialization routine RS1 executing the first flag initialization process, a second flag initialization routine RS2 executing the second flag initialization process, a first acceleration data routine RS3 executing the first acceleration data process, a second acceleration data routine RS4 executing the second acceleration data process, a filtering routine RS5 executing the filtering process, a trigger routine (acceleration determiner unit) RS6 executing the trigger determination process, an integration routine RS7 executing the integration process, a speed profile routine (speed variation determiner unit) RS8 executing the speed profile determination process, a first flag setting routine RS9 executing the first flag setting process, a second flag setting routine RS10 executing the second flag setting process, and an overflow routine (overflow unit) RS11 executing the overflow process.

Next, operation of the collision detector 11 will be described with reference to timing charts in FIGS. 11 to 13.

Figure 11A:
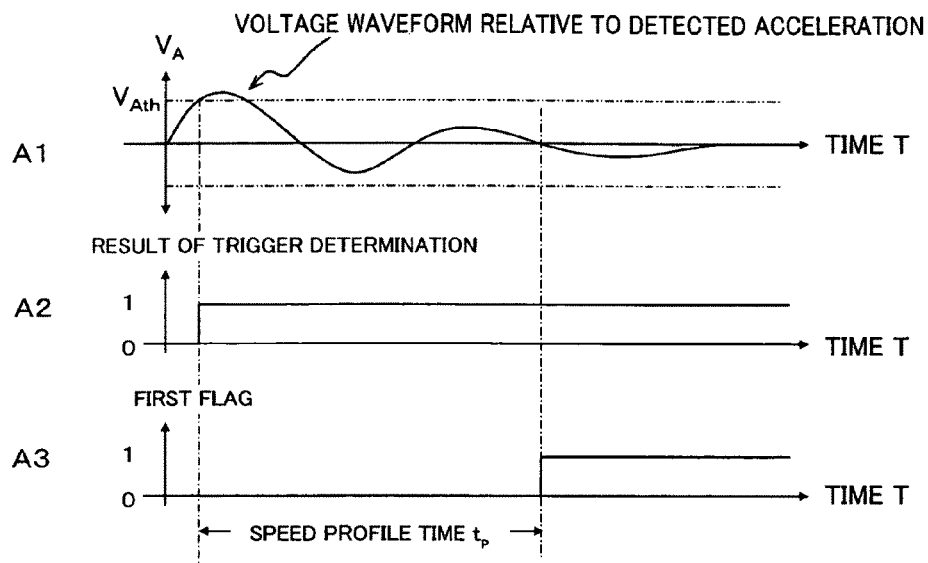
FIGS. 11A to 11C are timing charts for the main processing of a control program and show one example of variation in output potential of each acceleration sensor when two acceleration sensors show a similar pattern of variation in acceleration.
Figure 11B:
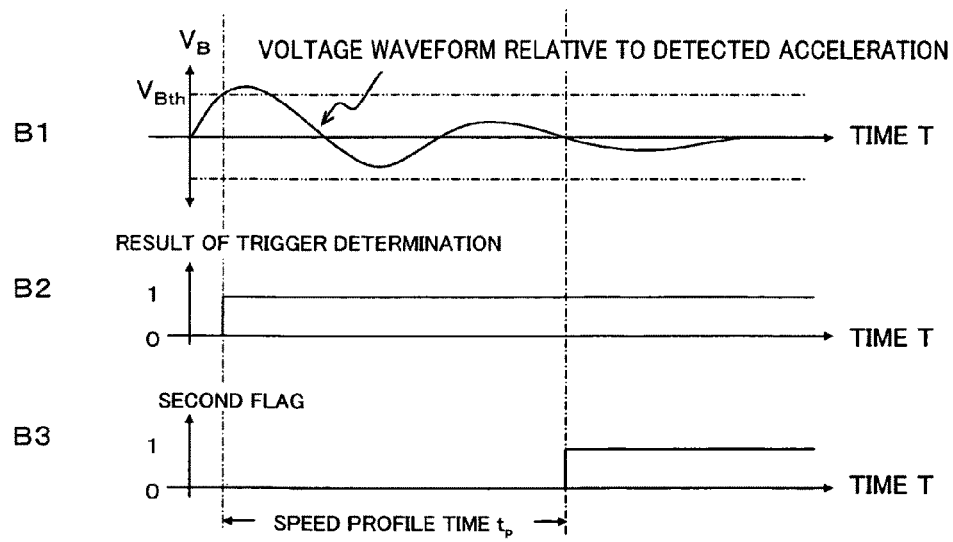
Figure 11C:
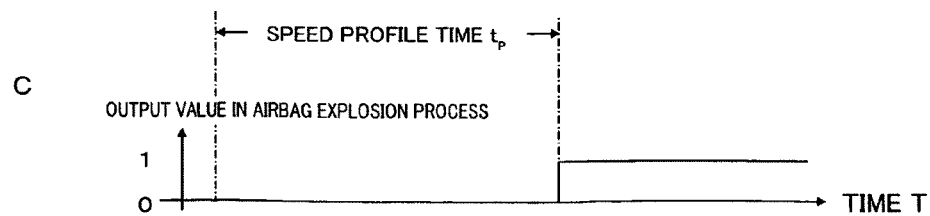

In FIG. 11A, A1 shows output potential of the acceleration sensor SA, A2 shows a logic value resulted from a trigger determination for the acceleration sensor SA, and A3 shows a logic value of a first flag. In FIG. 11B, B1 shows output potential of the acceleration sensor SB, B2 shows a logic value resulted from a trigger determination for the acceleration sensor SB, and A3 shows a logic value of a second flag. FIG. 11C shows a logic value resulted from an airbag explosion process. At a vehicle collision, the acceleration sensors SA, SB receive acceleration concurrently, and the collision causes their respective output voltages $V_A$, $V_B$ to vary over time as shown in A1 of FIG. 11A and B1 of FIG. 11B for example.

Since both of the output voltages $V_A$, $V_B$ are over the voltage thresholds $V_{Ath}$, $V_{Bth}$, results from the trigger determination at steps SA4, SB4 are 1 (true), as shown in A2 of FIG. 11A and B2 of FIG. 11B.

With both of the results being 1 at steps SA4, SB4, the speed profile determination is executed for the output voltages $V_A$, $V_B$ based on speed variation during speed profile time $t_p$ at steps SA6, SB7.

With the results being 1 at steps SA6, SB6 for both the output voltages $V_A$, $V_B$, and without the interruption resetting at step S4, the first and second flags show 1 (true) as shown in A3 of FIG. 11A and B3 of FIG. 11B. Thereby, a control signal is output in the airbag explosion process to activate the airbag module 14 as shown in FIG. 11C.

Figure 12A:
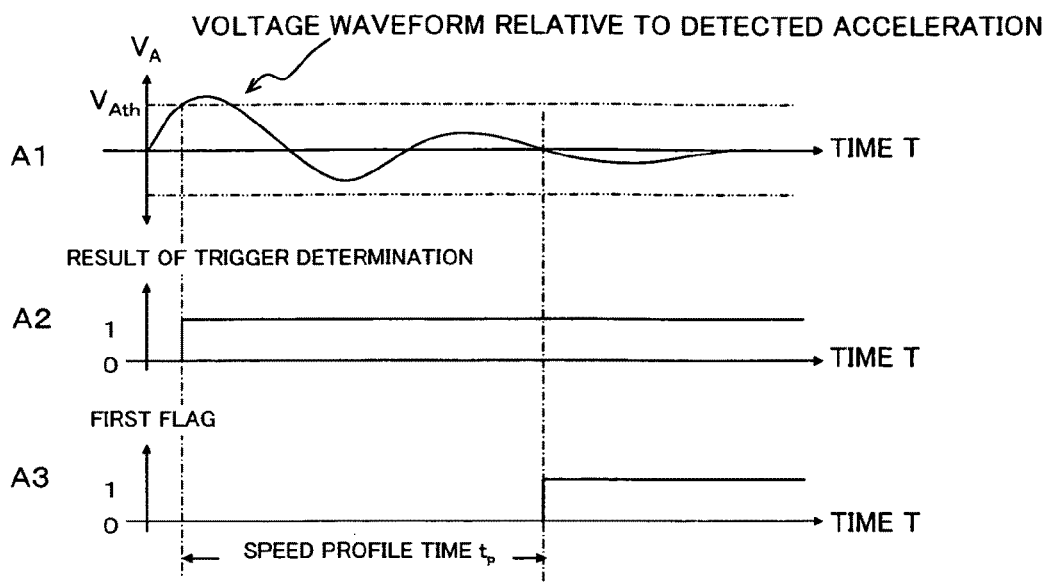
FIGS. 12A to 12C are timing charts for the main processing of a control program and show one example of variation in output potential of each acceleration sensor when two acceleration sensors show a similar pattern of variation in acceleration.
Figure 12B:
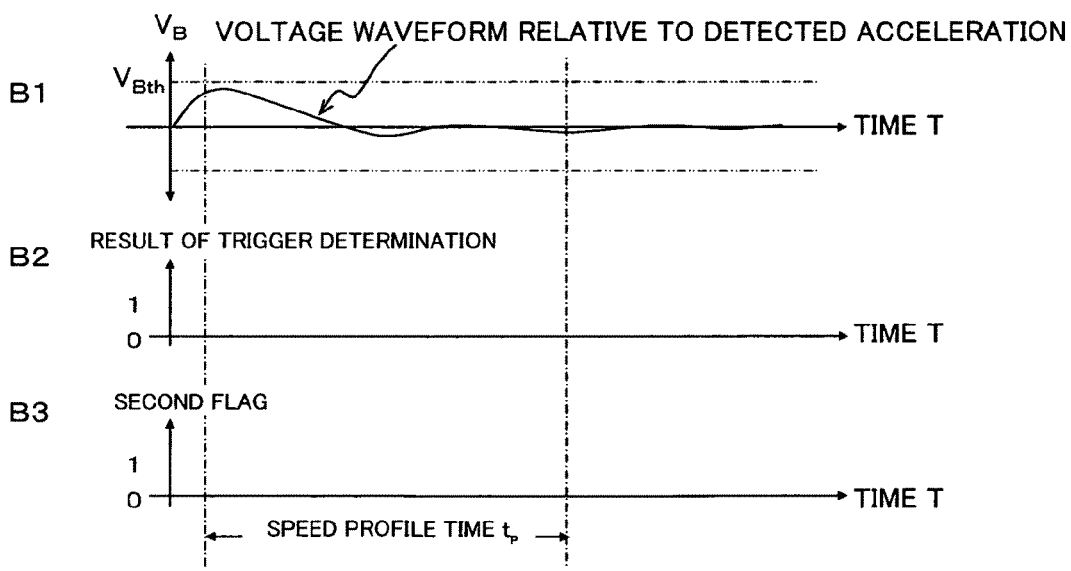
Figure 12C:
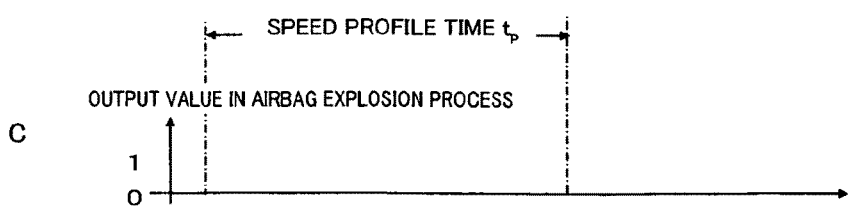

In FIG. 12A, A1 shows output potential of the acceleration sensor SA, A2 shows a logic value resulted from a trigger determination for the acceleration sensor SA, and A3 shows a logic value of a first flag. In FIG. 12B, B1 shows output potential of the acceleration sensor SB, B2 shows a logic value resulted from a trigger determination for the acceleration sensor SB, and A3 shows a logic value of a second flag. FIG. 12C shows a logic value resulted from the airbag explosion process. When a vehicle receives relatively large acceleration not caused by a collision, the output voltages $V_A$, $V_B$ of the acceleration sensors SA, SB show variations over time as shown in A1 of FIG. 12A and B1 of FIG. 12B, for example.

In this case, since the output voltage of the acceleration sensor SA exceeds the voltage threshold $V_{Ath}$, the result of the trigger determination is 1 (true) in step SA4, and the first flag shows 1 based on a speed variation in the speed profile determination SA6. Meanwhile, the output voltage of the acceleration sensor SB is lower than the voltage $V_{Bth}$, so that the result of the trigger determination is zero (false) in step SB4, and the second flag shows zero.

Therefore, a logical product of the logic values of the first and second flags is zero, and a control signal is not output and the airbag module 14 is not activated as shown in FIG. 12C.

As described above, the present embodiment is configured that to activate the airbag module 14, a collision determining condition need be satisfied for both of the acceleration sensors SA, SB. Accordingly, providing the acceleration sensors SA, SB at different appropriate positions in a vehicle makes it possible to more accurately determine a collision compared with providing a single acceleration sensor.

Note that the above-described collision determining condition is that the acceleration values $a_A$, $a_B$ of the acceleration sensors SA, SB are equal to or over the threshold $a_{th}$ and that a speed variation coincides with the pre-stored collision speed profile during the speed profile time $t_p$ which is after the acceleration values $a_A$, $a_B$ become equal to or over the threshold $a_{th}$.

The collision detector 11 according to the present embodiment includes circuits in stages preceding the A/D converters AD1, AD2 which are circuits (signal system) between the acceleration sensor SA and the A/D converter AD1 and between the acceleration sensor SB and the A/D converter AD2 to process analog signals. Electric noises such as electromagnetic noises entering such circuits may affect the collision detector 11.

Now, when the upper limits of the output voltages of the acceleration sensors SA, SB are the same 5V, the output voltages thereof at receiving a certain acceleration increase inversely as the detection ranges of the acceleration sensors SA, SB decrease. Because of this, when receiving the same acceleration, the acceleration sensor SB whose detection range is smaller than the acceleration sensor SA outputs a voltage larger than the acceleration sensor SA (FIGS. 13A, 13B, 14A, 14B).

Therefore, it can be said that the acceleration sensor SB outputting the larger output voltage has a larger S/N ratio than the acceleration sensor SA so that it is more unsusceptible to noises.

However, the acceleration sensor SB having a smaller detection range is to be in overflow state when receiving acceleration beyond its detection range and to be unable to detect a variation over the threshold $a_t$ of the detected acceleration $a_B$. This accordingly makes it impossible to execute the speed profile determination based on such a variation and perform accurate collision determination for the acceleration $a_B$ of the acceleration sensor SB.

In order to overcome such a problem, the collision detector 11 according to the present embodiment is configured to include the acceleration sensor SA having a larger detection range and a smaller S/N ratio than the acceleration sensor SB so that the acceleration sensor SA is more susceptible to noises than the acceleration sensor SB. However, the acceleration sensor SB can detect acceleration over the threshold $a_{th}$ of the detected acceleration $a_B$ of the acceleration sensor SB. Accordingly, the collision detector 11 is able to accurately determine a vehicle collision by executing the speed profile determination SA6 for the acceleration variation over the threshold $a_{th}$ of the detected acceleration $a_B$ which is undetectable by the acceleration sensor SB.

Figure 13A:
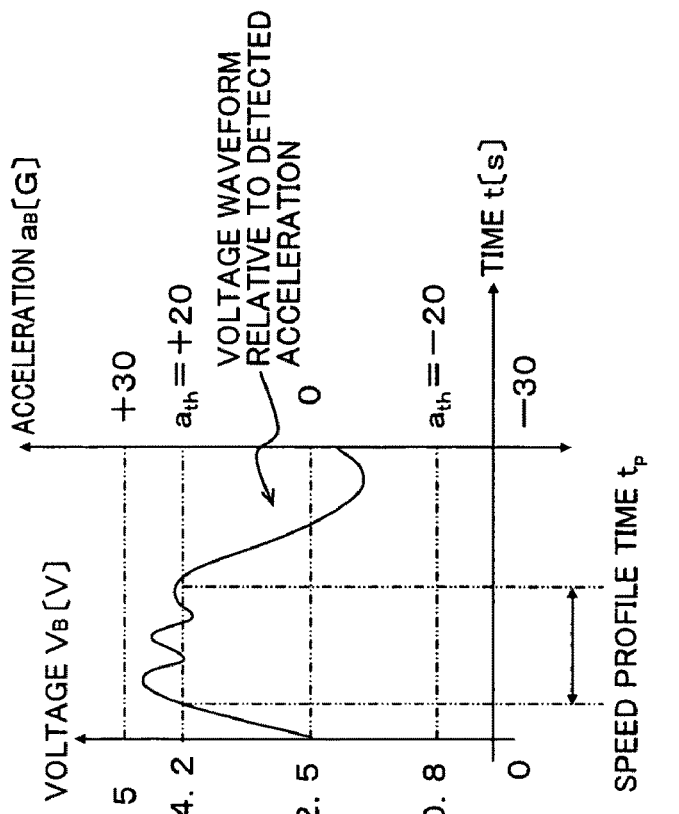
FIGS. 13A, 13B show one example of voltage waveform of each acceleration sensor when acceleration sensors show a similar pattern of variation in acceleration.
Figure 13B:
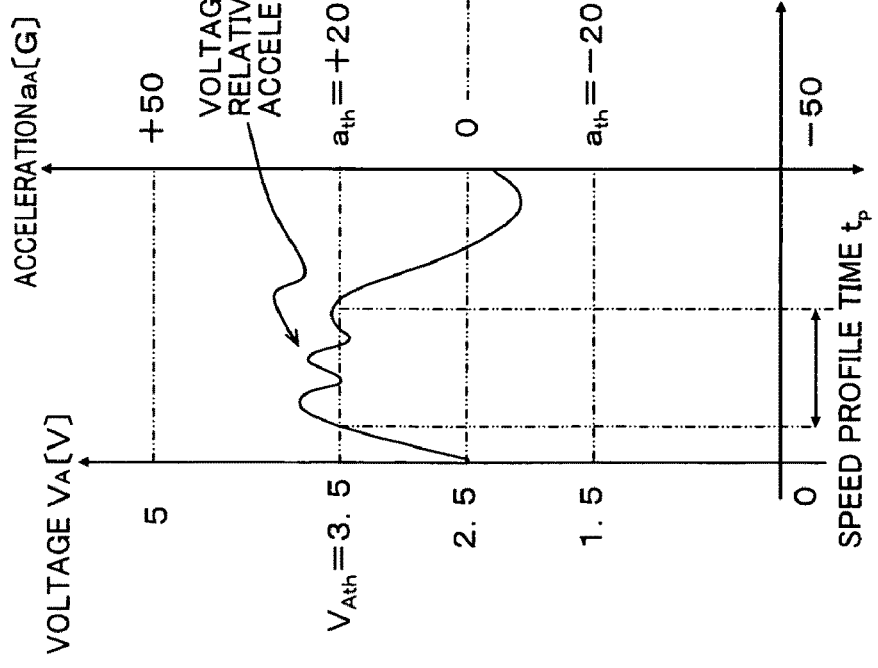
Figure 14A:
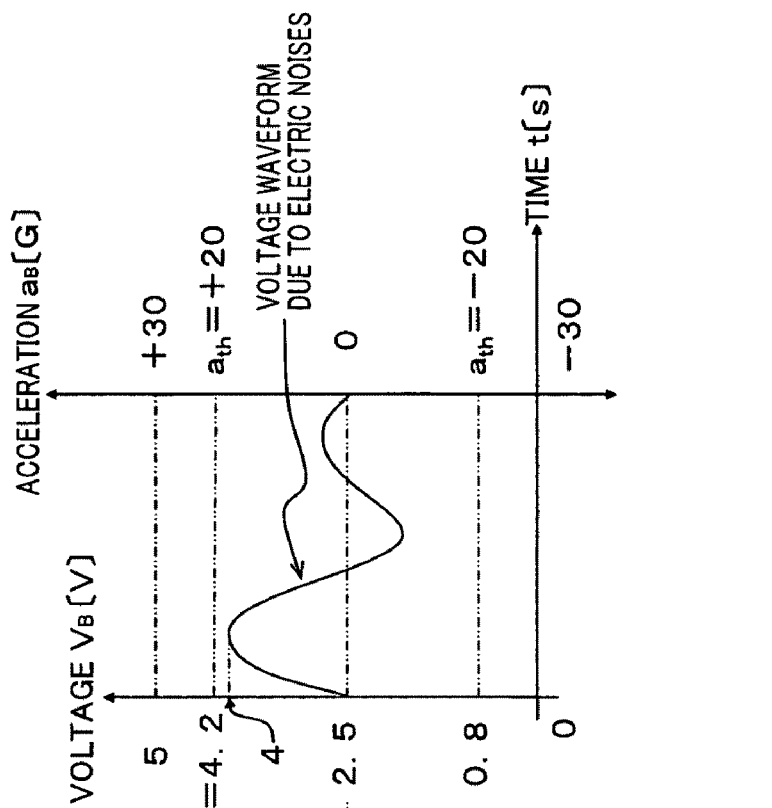
FIGS. 14A, 14B show one example of a noise signal entering the two acceleration sensors.
Figure 14B:
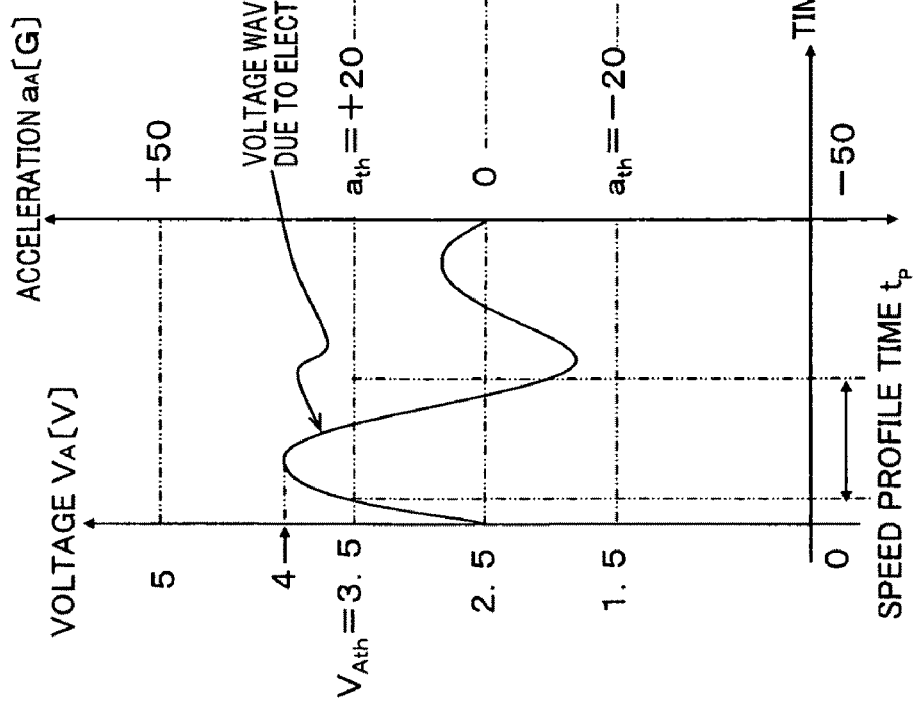

Furthermore, FIGS. 13A, 13B show a variation in accelerations $a_A$, $a_B$ of the acceleration sensors SA, SB over time when concurrently receiving acceleration due to a vehicle collision, respectively.

In this case, the accelerations $a_A$, $a_B$, of the acceleration sensors SA, SB both exceed the threshold $a_{th}$, so that results of the trigger determination SA4, SB4 will be 1 (true). Then, the speed profile determination SA6, SB7 is executed for the output voltages $V_A$, $V_B$ of the acceleration sensors SA, SB based on a speed variation in the speed profile time $t_p$ after the trigger determination SA4, SB4

Accordingly, results of the speed profile determination will be 1 (true) for both of the output voltages $V_A$, $V_B$ so that without the interrupt resetting process, a control signal is output in the airbag explosion process S5 to activate the airbag module 14.

In the present embodiment, although the acceleration sensors SA, SB have the same acceleration threshold $a_{th}$, their output voltage threshold $V_{Ath}$, $V_{Bth}$ relative to the threshold $a_{th}$ are set to be different from each other. The output voltage thresholds $V_{Ath}$, $V_{Bth}$ are expressed by the following equations:

$$V_{Ath} = V_C \pm (a_{th}/a_{Ar}) \times V_{C=}2.5 \pm (20/50) \times 2.5$$
$$= 2.5 \pm 1.5[V] = 3.5[V] \text{ or } 1.5[V]$$

$$V_{Bth} = V_C \pm (a_{th}/a_{Br}) \times V_{C=}2.5 \pm (20/30) \times 2.5$$
$$\approx 2.5 \pm 1.7[V] = 4.2[V] \text{ or } 0.8[V]$$

Further, electric noises entering the circuits between the A/D converter AD1, AD2 are added to the center value $V_C$ of the output voltages of the acceleration sensors SA, SB. A voltage value $V_N$ of a noise signal detected is defined by $V_C \pm V_N$, that is, 1.7[V]>1.5[V]. Therefore, the signal system of the acceleration sensor SB is configured to be less susceptible to noises than that of the acceleration sensor SA.

Accordingly, the collision detector 11 according to the present embodiment is configured not to activate the airbag module 14 unless the collision is determined from the acceleration values of the both of the acceleration sensors SA, SB concurrently. Thus, the airbag module 14 can be prevented from erroneously activated due to electric noises unless a noise signal with a voltage 1.7V (absolute value) or more enters the signal system between the acceleration sensor SB and the A/D converter AD2 and a variation in the noise signal over time coincides with the preset speed variation profile.

As described above, the collision detector 11 according to the present embodiment advantageously comprise the acceleration sensor SA having a wider detection range and the acceleration sensor SB more unsusceptible to noises.

The collision detector 11 according to the first embodiment comprises the first and second collision routines R1, R2 in which a determination is made on whether or not variations in the detected accelerations $a_A$, $a_B$ of the acceleration sensors SA, SB are caused by a vehicle collision. The airbag module 14 is activated according to the final collision routine R3 only when results of both of the collision routines R1, R2 indicate a vehicle collision (logic value=1). Accordingly, placing the acceleration sensors SA, SB at appropriate positions in a vehicle makes it possible to accurately determine a vehicle collision and prevent the airbag module 14 from being erroneously activated.

Moreover, the collision determination is made independently for each acceleration sensor SA, SB so that it is possible to prevent erroneous collision determination in the prior art which is caused by noise signals interfering with each other and increasing in the signal paths of the acceleration sensors S1, S2.

Further, the first and second collision routines R1, R2 comprise the trigger routine RS6 in which a determination is made on whether or not detected accelerations $a_A$, $a_B$ of the acceleration sensors SA, SB are the threshold $a_{th}$ or more, and the speed profile routine RS8 in which a determination is made on whether or not a speed variation of a vehicle coincides with the pre-stored speed variation at a collision, after determining that the detected accelerations $a_A$, $a_B$ are the threshold $a_{th}$ or more.

This enables the collision detector 11 to perform more accurate collision determination and also reduce frequency of erroneous collision determination due to noise signals since not only the results of the determination for the detected accelerations but also the speed variation profile after the detected acceleration reaching or exceeding the threshold $a_{th}$ are taken into consideration for the collision determination.

Furthermore, the signal system of the acceleration sensor SB is set to be more unsusceptible to noises than that of the acceleration sensor SA owing to its higher S/N ratio since the output level thereof is set to be higher than that of the acceleration sensor SA.

Therefore, even when noises enter the signal systems of the acceleration sensor SA, SB, the collision detector 11 according to the first embodiment can show improved resistance to noises and be prevented from erroneously determining a collision due to the noises as long as the acceleration sensor SB having the higher output level is not affected by the noises.

Moreover, in the present embodiment, the acceleration sensor SA, SB have the same output voltage range, 0V to 5V but the detection range of the acceleration sensor SB is set to be −30 G to +30 G, smaller than that of the acceleration sensor SA, −50 G to +50 G. Thus, upon receiving the same acceleration, the voltage $V_B$ of the acceleration sensor SB will be higher than that $V_A$ of the acceleration sensor SA. That is, the output-side signal system of the acceleration sensor SB is less susceptible to noises than that of the acceleration sensor SA.

Figures 15A, 15B:
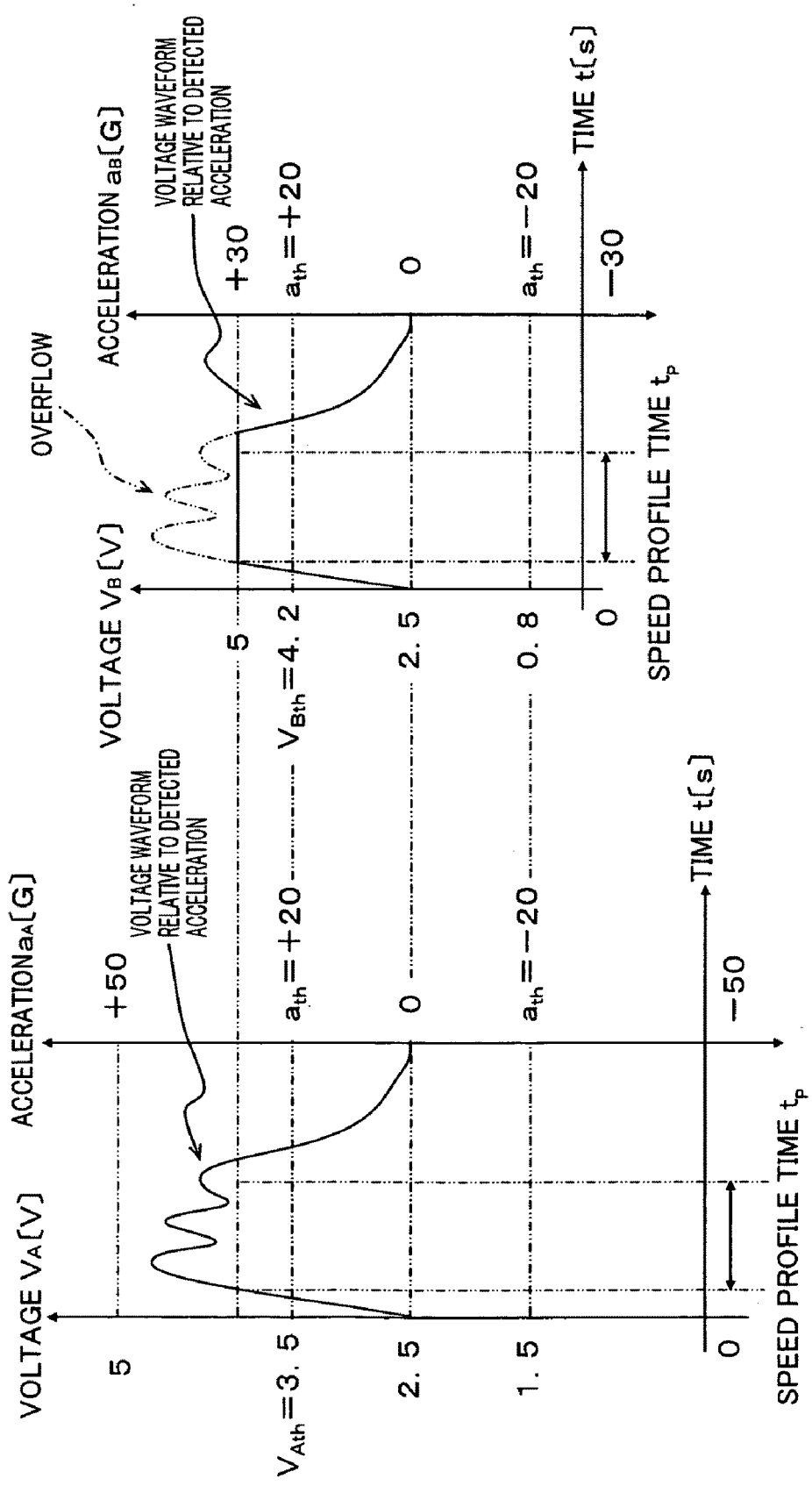
FIGS. 15A, 15B show one example of voltage waveform of each acceleration sensor when acceleration sensors receive acceleration with a similar profile.

Furthermore, in a case as shown in FIGS. 15A, 15B where the acceleration sensor SB receives acceleration $a_B$ which is equal to or over the absolute value $a_{Br}$ ($a_{Br}$=30 G) of the upper and lower limits of its detection range, the acceleration sensor SB is brought into an overflow state (FIG. 15B). However, the collision detector 11 according to the present embodiment can determine occurrence of a collision only from an output signal from the acceleration sensor SA through the overflow process SB5 and thereby accurately determine a vehicle collision through the speed profile determination process SA6 based on detected acceleration $a_A$ of the acceleration sensor SA.

As described above, the collision detector 11 according to the present embodiment is advantageously configured to include the acceleration sensor SA with an increased detection range and the acceleration sensor SB more unsusceptible to noises.

Second Embodiment

In the second embodiment, a description will be mainly made on a portion different from the first embodiment, and the same components as those in the first embodiment will be given the same numeric codes so that a description thereon will be omitted.

Although the first embodiment has not described a type of vehicle collision such as a front collision and a rear collision, needless to say that the front and rear collisions cause different variations in profiles of the detected accelerations $a_A, a_B$ of the acceleration sensors SA, SB. The first and second collision determination processes in the first embodiment use profile data on acceleration variation at a rear collision. Thus, the collision detector 11 according to the first embodiment is configured to activate the airbag module 14 upon satisfaction of a predetermined condition for a rear collision.

However, the activation timing for the airbag module 14 at a rear collision needs to be slightly delayed from that at a front collision (where vehicle occupants receive forward acceleration immediately after the collision). This is because at a rear collision, occupants receive backward acceleration immediately after the collision so that they are likely to be pressed onto seat backrests (driver's seat VS1, passenger's seat VS2) and then rebounded forward.

With the above taken into consideration, the collision detector 11 in the second embodiment is configured to slightly delay the activation timing for the airbag module 14 at a rear collision from that at a front collision, upon determining that a variation in detected accelerations $a_A, a_B$ of the acceleration sensors SA, SB is caused by a rear collision and determining to activate the airbag module 14.

The collision detectors 11 according to the first and second embodiments comprise different control programs P, however, the structures thereof are the same.

In the following, a control program P of the collision detector 11 according to the second embodiment will be described. A difference in the control programs P in the first and second embodiments is only in the main processing. The main processing will be described with reference to FIG. 16.

The control program P is configured to additionally include a rear collision determination process (later-described step SX) before the first collision determination and an activation delaying process (later-described step SY) before the airbag explosion process (S5). The rear collision determination is to determine whether or not variations in detected acceleration of the acceleration sensors SA, SB are caused by a rear collision. The activation delaying process delays the activation timing for the airbag module 14 from that at a front collision when the rear collision determination process determines that the variations in the acceleration $a_A, a_B$ are caused by a rear collision.

Figure 17:
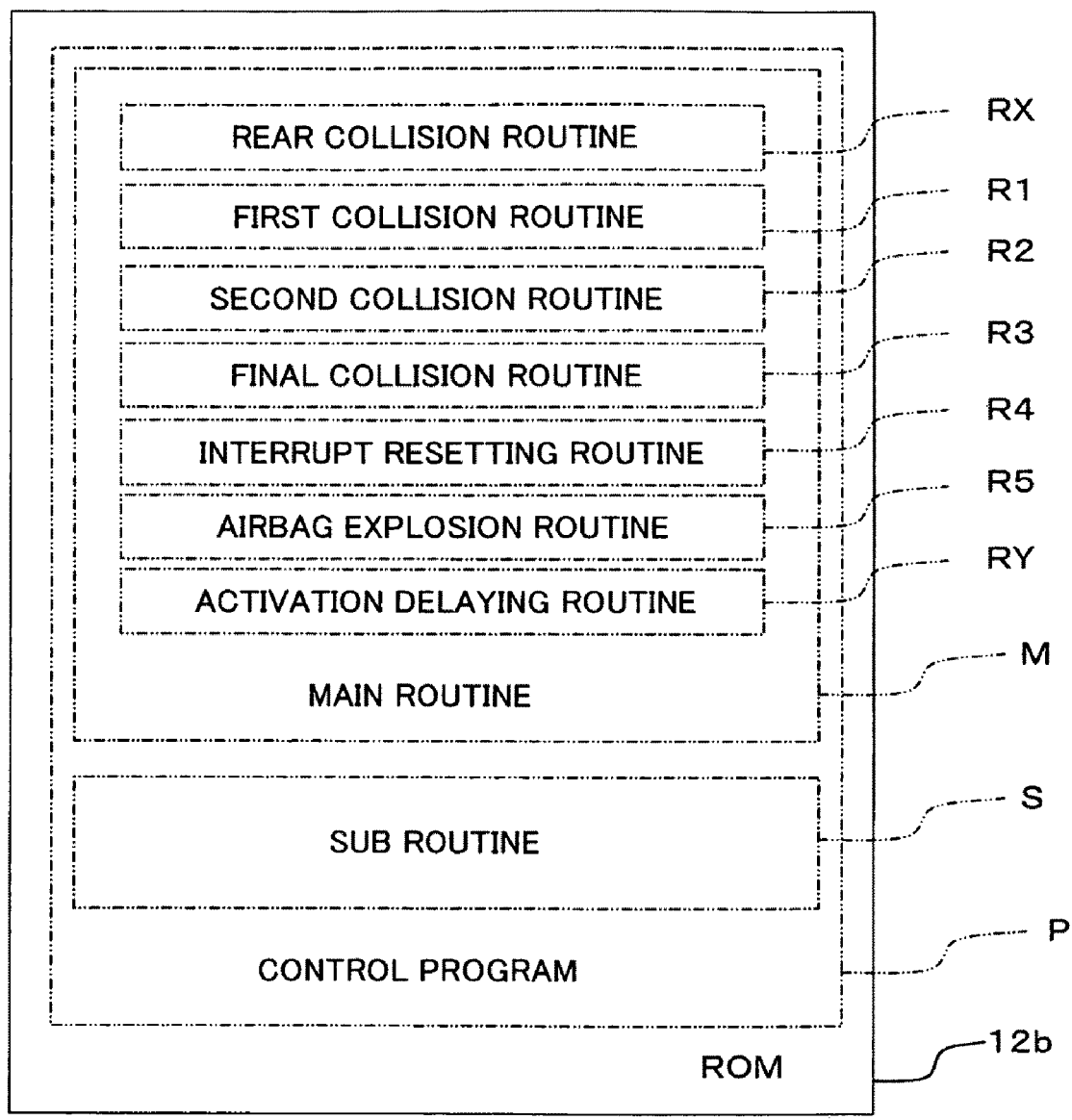
FIG. 17 shows a structure of the control program according to the second embodiment.

As shown in FIG. 17, the control program P is stored in the ROM 12b and comprised of a main routine M and a sub routine S.

The main routine M includes a rear collision routine RX (rear collision determiner unit) and an activation delay routine (activation delaying unit) RY in addition to the main routine M in the first embodiment. The sub routine S is structured the same as that in the first embodiment so that FIG. 17 omits showing it.

Figure 16:
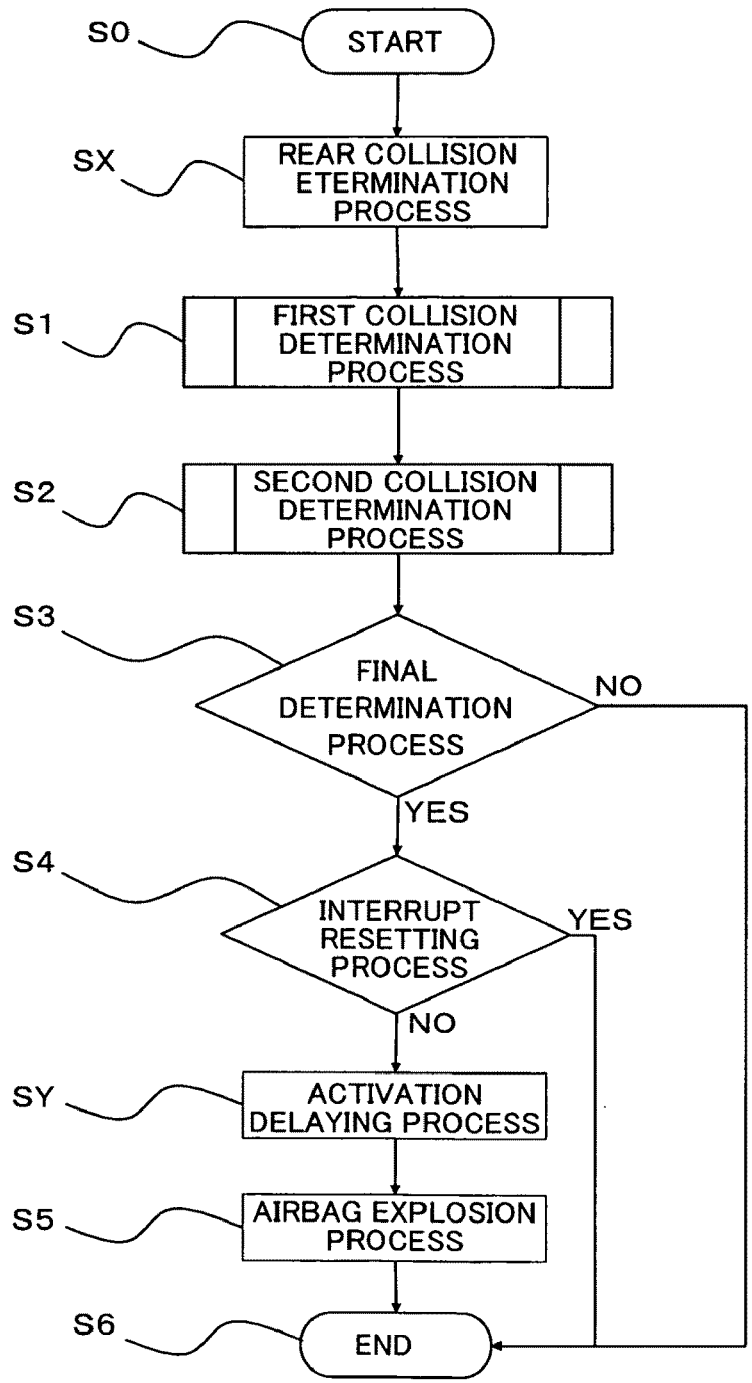
FIG. 16 is a flowchart describing the main processing of a control program according to the second embodiment.

Next, the main processing of the control program P according to the present embodiment will be described with reference to FIG. 16.

At step S0, the main processing of the control program P starts.

At step SX, the rear collision determination process starts. The control program P includes a rear collision flag in which a result of the rear collision determination is stored as a logic value. In the rear collision determination, the rear collision flag is set to 1 (true) when the detected accelerations $a_A, a_B$ of the acceleration sensors SA, SB are both negative values and rapidly (during the speed profile time $t_p$) exceed a predetermined threshold $a_{th}'$. The present embodiment omits describing the same processes as those in the first embodiment such as a rear collision flag initialization process.

At step S1 the first collision determination (FIG. 7) is executed.

At step S2 the second collision determination (FIG. 8) is executed.

At step S3 the above-described final determination is executed.

At step S4 the above-described interrupt resetting is executed.

At step SY the activation delaying process is started, in which at the logic value of the rear collision flag being 1, the flow proceeds to step S5 after a lapse of a delay time $t_d$ by which activation of the airbag module 14 is delayed elapses, and at the logic value being 0, the flow immediately proceeds to step S5.

At step S5, a control signal is output to the activator circuit 13 in order to activate the airbag module 14.

At step S6, the main processing of the control program P is completed.

As described above, the collision detector 11 is configured to delay the activation timing for the airbag module 14 at a rear collision from that at a front collision when the acceleration sensors SA, SB concurrently detect acceleration due to a collision, variations in the acceleration $_{aA, aB}$ are determined to be cause by a rear collision, and the airbag module 14 is to be activated.

According to the second embodiment, the collision detector 11 can activate the airbag module 14 at a good timing at occurrence of a rear collision and protect occupant(s) of a vehicle more securely since it is configured to delay the activation timing for the airbag module 14 at a rear collision when determining that variations in the detected accelerations $_{aA, aB}$ of the acceleration sensors SA, SB are caused by a rear collision and the airbag module 14 is to be activated.

As described through the present embodiments, the collision detector of the present invention can prevent the occupant protector unit from erroneously operating by disposing the acceleration sensors at appropriate positions in a vehicle and can accurately determine occurrence of a collision.

Further, according to the present invention, collision determination is performed for each acceleration sensor independently so that noise interference with the acceleration sensors does not happen as in the prior art. Accordingly, the collision detector can be prevented from making erroneous determination due to the noise signal interference.

Further, the collision detector according to the present invention can make more accurate collision determination and reduce frequency of erroneous determination due to noise signals by using, for collision determination, not only a result of the determination for the detected acceleration being over the threshold but also the speed variation profile after the detected acceleration reaching the threshold.

Further, according to the present invention, at least one of the acceleration sensors is set to be higher in output level than the other acceleration sensor(s) so that the signal system of this one acceleration sensor has a higher S/N ratio than the other one(s) and is therefore more unsusceptible to noises.

Further, the collision detector according to the present invention can be prevented from making erroneous collision determination due to noise as long as at least one acceleration sensor with a higher output level is not affected from noises which enter the signal systems of at least two or more acceleration sensors.

The present embodiment has described an example in which processing of each of the collision determiner unit, final determiner unit, acceleration determiner unit, and speed variation determiner unit is executed by software. However, it can be executed by an electronic circuit.

The present embodiment has described an example of using the two acceleration sensors; however, the present invention is not limited thereto. The number of acceleration sensors can be three or more, and also in this case the collision determination is performed for each of the acceleration sensors to obtain a logical product of the resultants.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A collision detector which detects a collision of a vehicle to activate an occupant protector unit, comprising:
    a plurality of acceleration sensors provided at different positions in the vehicle to detect acceleration of the vehicle;
    a collision determiner unit which determines whether or not a variation in the acceleration detected by each of the acceleration sensors is caused by a collision of the vehicle;
    a final determiner unit which activates the occupant protector unit when the collision determiner unit determines that all of variations in the acceleration detected by each acceleration sensor are caused by a collision of the vehicle;
    an acceleration determiner unit which determines whether or not the acceleration detected by each acceleration sensor is equal to or over a predetermined threshold; and
    a speed variation determiner unit which determines whether or not a speed variation of the vehicle coincides with a pre-stored speed variation which occurs at a collision, when the acceleration determiner unit determines that the acceleration is equal to or over the predetermined threshold, wherein
    when receiving a same acceleration, at least one of the acceleration sensors is set to be higher in output level than the other acceleration sensor(s).

2. A collision detector according to claim 1, further comprising an overflow unit which determines whether or not a collision of the vehicle occurs according to an output level of the other acceleration sensor(s) when an output level of said at least one acceleration sensor reaches an upper limit or a lower limit.

3. A collision detector according to claim 1, further comprising:
    a rear collision determiner unit which determines which of a front collision and a rear collision causes a variation in the detected acceleration of each of the acceleration sensors; and
    an activation delaying unit which delays an activation timing for the occupant protection unit from an activation timing for the occupant protection unit at a front collision when the rear collision determiner unit determines that a rear collision causes the variation in the detected acceleration of each of the acceleration sensors, wherein
    the activation delaying unit delays the activation timing for the occupant protection unit from the activation timing for the occupant protection unit at a front collision when the rear collision determiner unit determines that a rear collision causes the variation in the detected acceleration of each of the acceleration sensors, and when the final determiner unit activates the occupant protector unit.

4. A collision detector according to claim 2, further comprising:
    a rear collision determiner unit which determines which of a front collision and a rear collision causes a variation in the detected acceleration of each of the acceleration sensors; and
    an activation delaying unit which delays an activation timing for the occupant protection unit from an activation timing for the occupant protection unit at a front collision when the rear collision determiner unit determines that a rear collision causes the variation in the detected acceleration of each of the acceleration sensors, wherein the activation delaying unit delays the activation timing for the occupant protection unit from the activation timing for the occupant protection unit at a front collision when the rear collision determiner unit determines that a rear collision causes the variation in the detected acceleration of each of the acceleration sensors, and when the final determiner unit activates the occupant protector unit.

* * * * *